United States Patent [19]
Tamura

[11] 4,247,187
[45] Jan. 27, 1981

[54] CAMERA HAVING FOCUS DETECTION DEVICE

[75] Inventor: Shuichi Tamura, Yokohama, Japan

[73] Assignee: Canon Kabushiki Kaisha, Tokyo, Japan

[21] Appl. No.: 922,647

[22] Filed: Jul. 7, 1978

[30] Foreign Application Priority Data

Jul. 14, 1977 [JP] Japan ................................. 52-84410
Aug. 5, 1977 [JP] Japan ................................. 52-93998

[51] Int. Cl.³ ............................................. G03B 3/10
[52] U.S. Cl. ................................... 354/25; 354/60 R
[58] Field of Search ................ 354/25, 195, 196, 198, 354/60 R; 355/56; 352/140

[56] References Cited

U.S. PATENT DOCUMENTS

| | | | |
|---|---|---|---|
| 3,618,499 | 11/1971 | Harvey | 354/196 X |
| 3,836,919 | 9/1974 | Matsumoto et al. | 354/25 |
| 3,936,187 | 2/1976 | Momose | 354/25 X |
| 4,126,874 | 11/1978 | Suzuki et al. | 354/60 R |
| 4,154,517 | 5/1979 | Tamura et al. | 354/25 |
| 4,156,563 | 5/1979 | Kato | 354/25 |

*Primary Examiner*—Michael L. Gellner
*Attorney, Agent, or Firm*—Toren, McGeady and Stanger

[57] ABSTRACT

In the disclosed camera, when the object of principal photographic interest becomes so dim as to prevent satisfactory operation of the focus detecting device, or when the actual voltage of a battery falls below a satisfactory operating level for the device, a supplementary device can be rendered operative to control setting of a photo-taking lens independently of the focus detecting device. The camera can then be focused at an appropriate distance depending upon the size of diaphragm aperture, namely, in a pan-focus position.

According to an embodiment of the invention, an exposure control apparatus in the camera is made associated with the aforesaid two devices to operate in response to the taking lens having been set. The supplementary system is disabled until needed.

45 Claims, 13 Drawing Figures

F I G.10
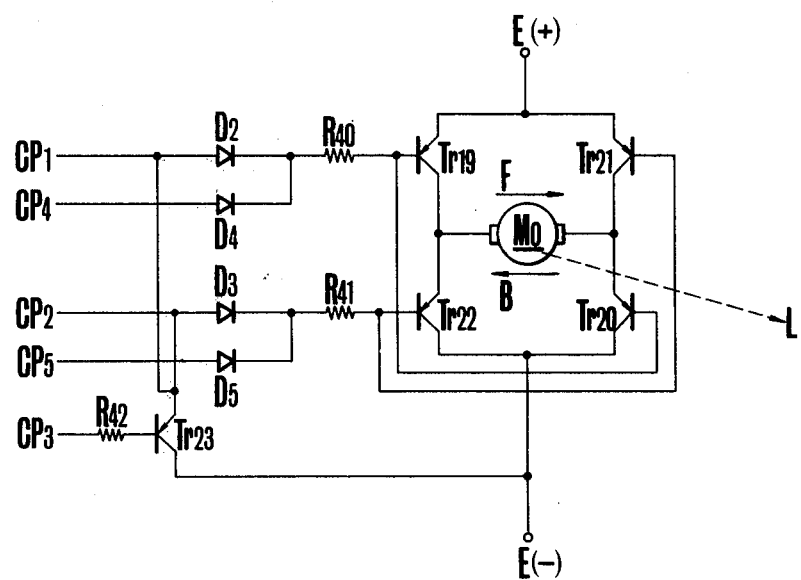

CAMERA HAVING FOCUS DETECTION DEVICE

BACKGROUND OF THE INVENTION

1. Field of the Invention

This invention relates to photographic cameras, and more particularly to cameras provided with automatic sharp focus detecting devices for electrically detecting the sharpest focus position of a photo-taking lens relative to an object to be photographed or with automatic focus adjusting devices for automaticallyv adjusting a photo-taking lens to its sharpest focus position.

2. Description of the Prior Art

Many devices have been proposed for automatically detecting the sharpest focus position of a photo-taking lens relative to an object to be photographed and for automatically adjusting a photo-taking lens to the sharpest focus position. And, many efforts have been devoted to practical application of these devices to cameras of reduced size.

Regrettably, however, conventional types of automatic sharp focus detecting devices or automatic focus adjusting devices can not function perfectly under all the conditions, and are unavoidably limited in performance. Thus it is impossible to detect the condition of sharpest focus in some given photographic situations. For example, these devices may be classified into two main groups, namely, what is called "passive" type where ambient illumination on an object to be photomgraphed is utilized, and what is called "active" type where a radiation (visible light, infrared light and the like) is projected artificially onto the object, and the reflected radiation is utilized. The former type of device, because of the utilization of the radiation emanating from the object itself only, make it impossible to focus sharply when the object brightness is less than the radiation detectable level of the radiation sensor. On the other hand, in the latter type device, because of the independence of the radiation from the object itself, the disadvantage of the former type can be overcome. However, when the object has rough surfaces, or when the object is comparatively far, the intensity of radiation reflected is extremely low so that the detection of sharpest focus can not be performed properly. In addition thereto, this active device necessitates a radiation source such as a light projector which is generally of large consumption of electrical energy. On the other hand, electrical power source capacity in a camera of reduced size is limited, and therefore, the amount of electrical energy supplied for production of the radiation is limited. This also leads to the limitation of the possible maximum level of radiation energy to be projected. As a result, the range of object distances for which the sharp focus detection is possible becomes narrower and thereby increases the opportunity for focusing errors.

Another problem arising in practical application of the automatic sharp focus detecting devices or the automatic focus adjusting devices into the cameras of reduced size, is that, the capacity of the electrical energy source in the camera is limited. In general, these devices consume comparatively large amounts of electrical energy, regardless of whether the device is of the passive or active type, and can not operate properly when the supplied voltage drops below a satisfactory operating level for the device. It is of importance, therefore, to take this fact into account in the practical application of these devices into cameras of reduced size.

Many attempts have been made to overcome the above mentioned drawbacks, but have failed to provide decisive solutions therefor.

It is to be understood from the foregoing that, in practical application of these automatic focus detecting or focus adjusting devices into the cameras, it is advantageous to provide a supplementary device in a relieving sense for the purpose of making it possible to obtain a condition of approximate focusing, although not the perfectly sharpest focus, so that the photographer is enabled to take photographs under the permissible focusing condition when the detection of a condition of sharpest focus can not be performed in a satisfactory manner due to the above mentioned reasons.

In addition to this, from the standpoint of the particular characteristics of photographic cameras, it is further advantageous to make an exposure control apparatus cooperative with the focusing system in such a manner that, when the focus detection can not be performed satisfactorily, the exposure control apparatus is rendered inoperative, and only when the photo-taking lens is properly focused on the object by the use of the automatic sharp focus detecting device or the automatic focus adjusting device, or when the taking lens is adjusted to the approximated focus position by the use of the supplementary device, said exposure control apparatus is rendered operative automatically, thereby the otherwise wasteful consumption of film due to the making of exposures with an unacceptable lack of sharpness of images can be prevented.

SUMMARY OF THE INVENTION

With the foregoing in mind, the present invention provides a camera having an automatic sharp focus detecting device or an automatic focus adjusting device with a relief means rendering it possible to approximately focus the camera when said device is subject to a condition in which satisfactory operation for detection of sharpest focus is not assured. In other words, more concretely speaking, a principal object of the present invention is as a camera having a device receptive of radiation from an object to be photographed for finally detecting a condition of sharpest focus, to render it possible to adjust the photo-taking lens to an approximate focus position independently of said device, thereby photographs can be taken under the permissible focusing condition.

To achieve this object, according to the present invention, when the detected object brightness level is less than that at which the aforementioned automatic sharp focus detecting device or automatic focus adjusting device operates satisfactorily, a supplementary device can be rendered operative either manually or automatically to make it possible to adjust the taking lens to the approximate focus position instead of the aforementioned automatic device.

In a preferred embodiment of the present invention, this supplementary device is constructed so as to make it possible to adjust the lens to a pan-focus position where an image of the object can be formed with an acceptable sharpness on the film plane, in other words, more strictly speaking, in such a manner to take into account the hyper focal range of the used lens. In this case, as is employed in the embodiments of the invention to be described later, it is more advantageous to change the lens adjusting position in accordance with the size of diaphragm aperture.

Another object of the present invention is in addition to the aforesaid main object, is to make it possible to adjust the photo-taking lens to the approximate focus position independently of the automatic sharp focus detecting device even when the voltage of an electrical power source of the camera is below a satisfactory operating level for the detecting device, so that photographs can be taken under a permissible focussing condition.

To achieve this object, according to the present invention, in addition to the above mentioned characteristic features, a more advantageous construction is proposed in which the above mentioned supplementary device can be rendered operative either manually or automatically when the voltage of the electrical power source in the camera falls below a predetermined level.

In this case, it is comparatively important to minimize the consumption of electrical energy by the supplementary device.

A further object of the present invention is to simplify the manual changeover operation from the aforesaid automatic sharp focus detecting device to the supplementary device so as not to require complicated manipulation at the time of photographing.

To achieve this object, according to a preferred embodiment of the present invention, the supplementary device is arranged to be rendered operative in response to a rearward movement of the photo-taking lens beyond the infinitely focused position.

A further object of the present invention is to insure that the changeover operation from the aforesaid automatic sharp focus detecting device to the supplementary device is automatically effected with high reliability by use of a very simple circuit construction.

A further more object of the present invention is more effectively to prevent the wasteful consumption of electrical energy of a battery in the camera when the camera is equipped with the automatic sharp focus detecting device together with the supplementary device.

To achieve this object, according to a preferred embodiment of the present invention, a more advantageous arrangement is proposed in which the power supply to the supplementary device is automatically applied only when it is established that the satisfactory detection of the sharpest focus is not assured by the aforesaid automatic sharp focus detecting device. In addition, according to another embodiment of the invention, a more advantageous arrangement for automatically cutting off the power supply to the aforesaid automatic sharp focus detecting device, particularly when the voltage of the battery is lowered below a predetermined level, is proposed.

Still another object of the present invention is to clearly indicate the fact that the adjustment of the photo-taking lens to the sharpest focus position is achieved by the use of the aforesaid automatic sharp focus detecting device, the fact that the satisfactory detection of a condition of sharpest focus by the automatic sharp focus detecting device is not assured and therefore the aforesaid supplementary device is rendered effective instead of the automatic focus detecting device, and the fact that the adjustment of the photo-taking lens to the approximate focus position is accomplished by the use of the supplementary device.

Yet another object of the present invention is to achieve overall automatization of the adjustment of the photo-taking lens by automatic selection of either the automatic focus detecting device or the supplementary device.

A still further object of the present invention is to enable a camera having an automatic sharp focus detecting device or an automatic focus adjusting device to be effectively prevented from wasteful consumption of film due to improper focus of the photo-taking lens.

With paticular respect to this object, according to the present invention, a more advantageous arrangement and construction of the camera is proposed in which an exposure control apparatus is rendered inoperative when satisfactory detection of the sharpest focus by the automatic sharp focus detecting device is not fully assured, and then is automatically rendered operative only when the focus adjustment of the photo-taking lens to the proper sharp focus position by the use of the aforesaid automatic sharp focus detecting device, or to the approximate focus position by the use of the aforesaid supplementary device, has been accomplished.

These and other objects and features of the present invention will become apparent from the following detailed description taken in conjunction with the accompanying drawings.

BRIEF DESCRIPTION OF THE DRAWINGS

FIG. 1A is a schematic of a potentiometer in FIG. 1.

FIG. 10 is a similar diagram showing a part of a seventh embodiment of the invention which is different from the above mentioned embodiments.

DETAILED DESCRIPTION OF THE PREFERRED EMBODIMENTS

FIGS. 1 to 3(e) illustrate a first embodiment of the present invention.

This embodiment is common to all the other embodiments to be described, and concerns a camera having a range finder type automatic range detecting system. In the two camera detected images of an object to be photographed are photo-electrically sensed to produce an output signal representative of the distance between the camera and the object. The resulting output is compared by the focus detection circuit with the electrical signal representing the set position of a photo-taking lens to detect the proper focus position of the photo-taking lens to the object. It is, therefore, to be understood that this type automatic focus detecting device is illustrated as a mere example of the application of improvements of the invention, and that the improvememt of the invention is not confined thereto but applicable to other various types of focus detecting devices such as image sharpness detecting device or the like.

Figure 1:
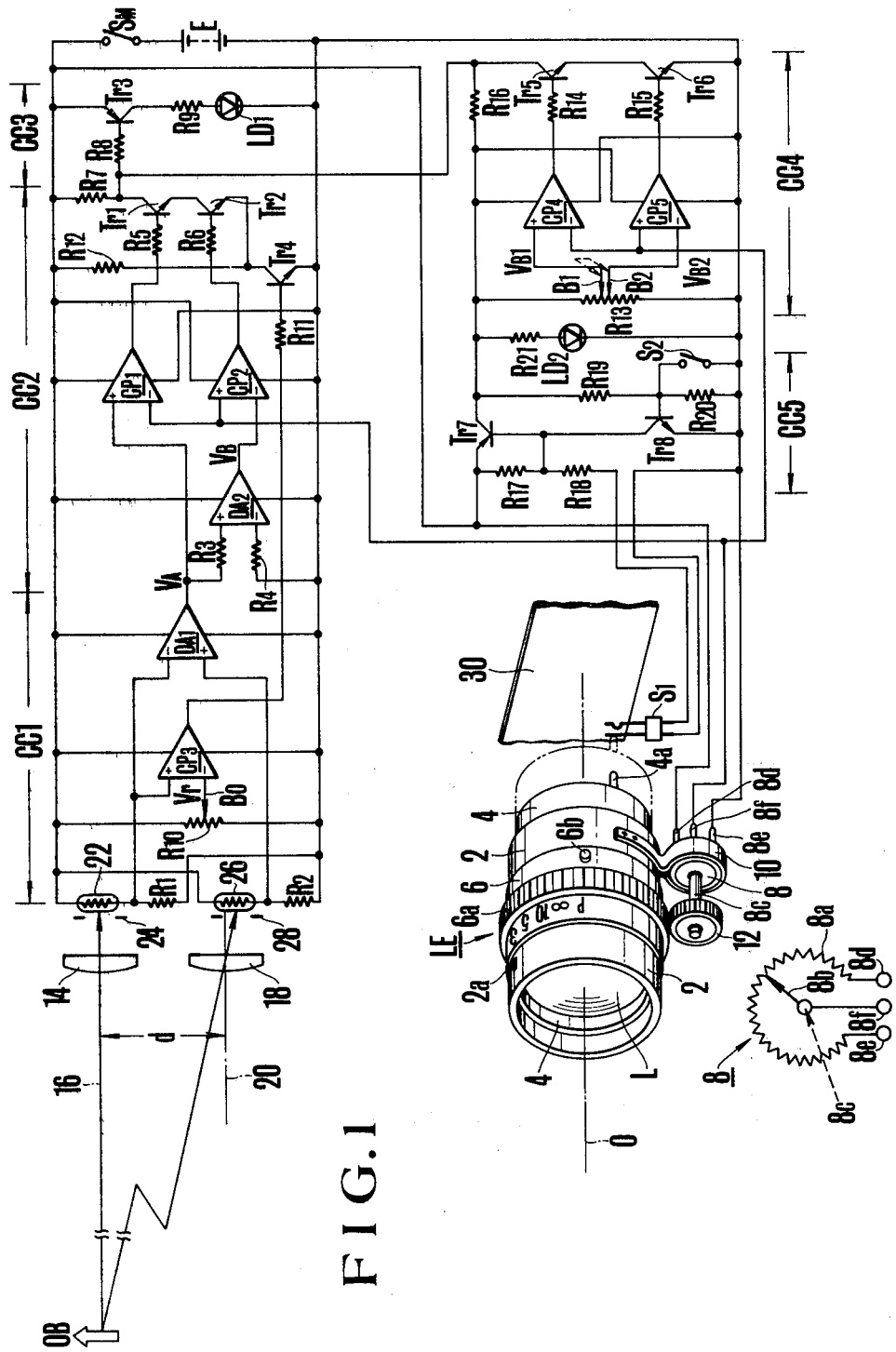
FIG. 1 is a partly diagrammatic and partly perspective view of a first embodiment of a camera having a focusing system according to the present invention.

In FIG. 1, a photo-taking lens assembly LE comprises a fixed tube 2, an axially movable sleeve 4 fixedly carrying a photo-taking lens L and fitted in the tube 2, and focusing ring 6 mounted on the outer diameter of the tube 2. The ring 6 is rotatable about an optical axis O of the lens L and restrained from axial movement. Though not shown, a focusing mechanism of construction known in the art is provided between the sleeve 4 and the ring. The mechanism may, for example, be composed a cam follower pin radially extending from the sleeve 4 through a longitudinal slot in the tube 2 and engaging a circumferential focusing cam groove of the ring 6 so that rotative movement of the ring 6 is transmitted to axial movement of the sleeve 4 which causes axial adjustment of the lens L along the optical axis O with respect to a film plane 30.

A potentiometer 8 is fixedly carried on the tube 2 by a fastener 10 and is constructed from a resistor winding 8a (see FIG. 1A) and a slider 8b, the latter is connected through a shaft 8c to a pinion 12 meshing with a toothed portion 6a of the focusing ring 6. The two ends of the resistor winding 8a are connected to respective terminals 8d and 8e which are connected to positive and negative buses of the circuit of FIG. 1 respectively, while the slider 8b is connected to an output terminal 8f which is connected to both of an automatic focus detecting circuit CC2 and a pan-focus detecting circuit CC4 respectively. The output of the potentiometer 8, therefore, represents the adjusted angular position of the focusing ring 6. From the standpoint of compact structure, the potentiometer 8 is constructed so that the resistor winding 8a and the slider 8b are incorporated between the tube 2 and the ring 6.

Figure 2:
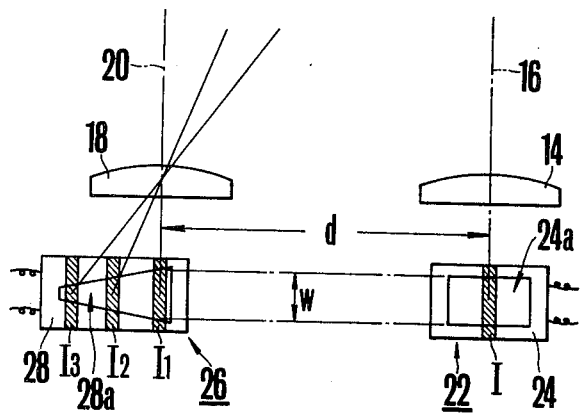
FIG. 2 is a schematic view showing an optical arrangement of a photoelectrical range detecting system of the embodiment shown in FIG. 1.

A distance measuring circuit CC1 includes a pair of photoconductive elements 22 and 26 having image receiving surfaces restricted by respective masks 24 and 28 and positioned behind respective cylindrical lenses 14 and 18. These lenses 14 and 18 constitute an optical system of the so-called range finder type focus detecting device, and have optical axes 16 and 20 respectively oriented parallel to each other and spaced by a base length d. As is shown in FIG. 2, the first mask 22 has a rectangular opening 24a whose center is aligned with the optical axis 16 of the lens 14, while the second mask 28 has an opening of trapezoidal (or triangular) shape with the base having a length equal to the width w of the rectangular opening 24a of the first mask 24, and is shifted to the left so that the optical axis 20 of the lens 18 intersects the trapezoid opening 28a near the center of the base. Since the combination of the lens 14 and the photoconductive element 22 is adapted as a sighting system for an object OB, in other words, the object OB is aligned with the optical axis 16, the lens 14 always forms a first linear detection image I of the object OB on the photoconductive element 22 through the mask 24 at an almost constant location, in this instance, at the center of the area 24a, independent of the distance between the camera and the object OB. The second lens 18 forms a second linear detection image of the same object OB on the photoconductive element 26 through the mask opening 28a at a different location in correspondence to the object distance. Namely, the lens 18 formes each images I1, I2 and I3 in correspondence to infinite, intermediate and nearest distances respectively. Accordingly, for an infinitely distant object, the resistance values of the photoconductive elements 22 and 26 are equal to each other. However, as the object distance is decreased, while the resistance value of the first photoconductive element 22 is maintained constant, the resistance value of the second photoconductive element 26 is increased. Thus the resulting difference between these resistance values of the both elements 22 and 26 changes as a function of the object distance. On the other hand, when the object brightness level is lowered, both of the resistance values of the photoconductive elements 22 and 26 become high. Hence, as will be described later in more detail, it is possible to determine whether or not the brightness of the object OB is below a predetermined level at which the focus detection by the focus detecting circuit CC2 is insured, on the basis of the output voltage of the photoconductive element 22.

In FIG. 1, the distance measuring circuit CC1 further includes a differential amplifier DA1 having an inversion (,i.e., inverting or reversing.) input connected to a point on connection between the photoconductive element 22 and a resistor R1 and having a non-inversion (,i.e. non-inverting or non-reversing.) input connected to a point between the photoconductive element 26 and a resistor R2. The resistors R1 and R2 have resistance values related to each other so that when the object OB is infinitely distant, the voltage levels of two inputs of the differential amplifier DA1 are equal to each other. As shown in FIG. 3(a), therefore, the output VA of the amplifier DA1 is zero for the object at infinity and exhibits an increasing voltage value with decrease in the object distance the output voltage reaches a maximum at close-ups.

The automatic focus detecting circuit CC2 includes a differential amplifier DA2 for subtracting a predetermined voltage value α from the output voltage VA of the aforesaid differential amplifier DA1 the amplifier DA2 has a non-inversion input connected to the output of the amplifier DA1 through a resistor R3 and has an inversion input connected through a resistor R4 to the negative bus. As shown in FIG. 3(a), therefore, the output voltage VB of the amplifier DA2 may be expressed as $VB = VA - α$. The value α is adjusted by varying the resistance values of the resistors R3 and R4. As will be described later in detail, the smaller the value α, the greater becomes the accuracy of the focus detection. The automatic focus detecting circuit CC2 further includes a pair of comparators CP1 and CP2 constituting a window type comparing circuit with the first comparator CP1 having (+) and (−) inputs connected to the outputs of the amplifier DA1 and the potentiometer 8 respectively. The second comparator CP2 has its (+) and (−) inputs connected to the outputs of the potentiometer 8 and the amplifier DA2 respectively. As shown in FIG. 3b, the potentiometer 8 is adjusted so that its voltage varies with the focusing distance of the lens L along the same slope and level as does the output voltage VA of the amplifier DA1. Thus when setting of the focusing ring 6 is set to a distance shorter than the exact object distance, the first comparator CP1 produces a low output which is applied through a resistor R5 to a base of first transistor Tr1, thereby the transistor Tr1 is rendered non-conductive. On the other hand, the output voltage VB of the amplifier DA2 is adjusted by the resistors R3 and R4 to be lower than the voltage VA by the magnitude α thus when the lens L is set at a longer distance than the sum of the exact object distance and a distance corresponding to the value α, the second comparator CP2 produces an output of low level. This is then applied to a second transistor Tr2 through a resistor R6, and the transistor Tr2 is rendered non-conductive. In consequence, when the lens L is set at a distance equal to or longer than the exact object distance 1 but shorter than the sum of the exact distance 1 and the distance β corresponding to the magnitude α, as shown in FIG. 3(b), the outputs of the both comparators CP1 and CP2 become high as a result the first and second transistors Tr1 and Tr2 are rendered conductive simultaneously.

The transistors Tr1 and Tr2 are connected in series to each other and to a transistor Tr4 between the positive and negative buses. Hence, when the object brightness level sensed by the first photoconductive element 22 is higher than a reference level set in a semi-fixed resistor R10 to which the reference level corresponding to the object brightness at which the operations of the circuits CC1 and CC2 are insured, is set by a slide Bo, a third comparator CP3 produces an output of high level which is applied to the base of the transistor Tr4 through a resistor R11, and renders the transistor Tr4 conductive. Such conduction of all the transistors Tr1, Tr2 and Tr4 causes conduction of a transistor Tr3 in a focus indication circuit CC3. This energizes a light-emitting diode LD1 with a power supply from a battery E, provided that a main switch SM connected in the positive terminal of the battery E and the positive bus is closed. The resistors R5 to R12 serve as protection elements for the transistors Tr1 to Tr4 and diode LD1.

A supplementary circuit CC4 in the form of the pan-focus detecting circuit makes it possible to set the lens L at a hyper-focal distance position independently of the automatic focus detecting circuit CC2 when satisfactory operation of the circuits CC1 and CC2 can not be assured. The circuit CC4 includes a variable resistor R13 for setting a hyper-focal distance, for example, upon the size of a diaphragm aperture. As is known in the art, the pan-focus range (from a particular distance to infinity in which the image of the object is formed with an acceptable sharpness on a film plane) for the photographic objectives generally depends upon its focal length f, and diaphragm value F. For example, with a 35 mm and F 2.0 objective, the hyper-focal distance is about 17.2 meters, and therefore, the pan-focus range to be from 8.6 meters to infinity. When the size of diaphragm aperture is decreased to F 4.0, the hyper-focal distance is shortened to about 8.6 meters with increase in the pan-focus range to 4.3 m$-\infty$. At F 5.6 and F 8.0, the hyper-focal distances are 6.2 and 4.4 meters respectively with the pan-focus ranges 3.1 m$-\infty$, and 2.2 m$-\infty$. To allow for the setting of the lens L to the hyper-focal distance position, a first slider B1 of the variable resistor R13 is arranged to cooperate with a diaphragm control mechanism, not shown. A second slider B2 is arranged to move together with the first slider B1 so that the output voltage VB2 appearing at the second slider B2 is varied as a function of $VB2 = VB1 - \alpha$, where VB1 is the voltage appearing at the first slider B1. The parameter α is preferably as small as possible likewise the difference α between the output voltage VA and VB of the above mentioned differential amplifiers DA1 and DA2, for the purpose of performing pan-focus detection with higher accuracy. The sliders B1 and B2 are connected to respective comparators CP4 and CP5 at one inputs of opposite sign, namely, (+) and (−) inputs thereof respectively, while the other inputs of the comparators CP4 and CP5 are connected by way of a common lead to the output of the potentiometer 8. Therefore, as in the circuit CC2 when the output of the comparators CP4 and CP5 are simultaneously high, in other words, when the output voltage of the potentiometer 8 lies within a voltage range of from VB2 to VB1, the setting of the lens L to the pan-focus position may be considered to be proper. It is noted that when the output of the comparator CP4 is of low, that is, when the output voltage of the potentiometer 8 is higher than VB1, the photo-taking lens L is focused at a shorter distance than the hyper-focal distance. Conversely, when the output of the comparator CP5 is low, that is, the output voltage of the potentiometer 8 is lower than VB2, the photo-taking lens L is focused at a longer distance than the hyper-focal distance. The outputs of the comparators CP4 and CP5 are connected to bases of transistors Tr5 and Tr6 through resistors R14 and R15 respectively. The transistor Tr5 has a collector connected to the base of the switching transistor Tr3 in the focus indication circuit CC3 and an emitter connected to the collector of the transistor Tr6 whose emitter is connected to the negative bus, so that when the lens L is set to the pan-focus position, the light-emitting diode LD1 is energized. The resistors R14 to R16 serve as protection elements.

As can be seen from the structure described above, the approximate focus position of the photo-taking lens L obtained by the function of the pan-focus detecting circuit CC4 may naturally coincide with the exact focus position in regard with the object OB.

A power supply and holding circuit CC5 for the pan-focus detecting circuit CC4 includes a switch S1 arranged close when the focusing ring 6 is turned to place a symbol P, which is located at a point beyond the infinite end of a range of distances, in coincidence with an index 2a on the outer periphery of the tube 2. Here, the lens L is moved further to the rear beyond the infinite focus position and a projection 4a rearwardly extending from the sleeve 4 pushes a movable contact of the switch S1. The lens assembly LE is constructed so that rotation of the ring 6 from the position as to the position P is restricted by a restricting mechanism (not shown) between the ring 6 and the tube 2. The restriction of the restricting mechanism can be released by the depression of a release button 6b the ring 6. The switch S1 is connected at one terminal to the negative bus and at the other terminal to the positive bus through a voltage divider of resistors R17 and R18 connected in series with each other. Connected to the output of the voltage divider is a base of a transistor Tr7 with an emitter connected to the positive bus and with a collector connected to control power supply to the circuit CC4 and a display circuit, the latter comprises a light-emitting diode LD2 and a resistor R21 connected in series to each other. In order to retain the power supply to the circuit CC4 regardless of the fact that the once closed switch S1 is opened as the focusing ring 6 is turned to set the lens L to the hyper-focal distance, there is provided a transistor Tr8 with a base connected to a point on connection between a resistors R19 and R20 which are connected between the collector of the transistor Tr7 and the negative bus, with a collector connected to the base of the transistor Tr7 and with a emitter connected to the negative bus. A power supply stop switch S2 is connected across the base and emitter of the transistor Tr8. The switch S2 is arranged to be closed manually or in association with camera wind-up operation. It is to be noted here that the button 6b serves to prevent accidental closure of the switch S1 from occurring for example, when the focusing ring 6 is operated near the infinite end of the distance range.

The operation of the camera of FIG. 1 is as follows. Now assuming that the optical axis O of the photo-taking lens L is aligned to the object OB at the distance l from the camera, then the optical axis 16 of the cylindrical lens 14 is in alignment with the object OB to form the detection image I of the object OB through the rectangular opening area 24a on the photoconductive element 22, while the optical axis 20 of the cylindrical lens 18 is taken off from the object OB to thereby form the detection image of the object OB on the photoconductive element 26 at a location shifted to the left from the base of the trapezoid open area 28a in correspondence to the object distance l. Under this condition, when the power switch SM is closed to supply the distance measuring circuit CC1 and the automatic focus detecting circuit CC2 with electrical energy from the battery E, the distance measuring circuit CC1 produces an output voltage VA which is a function of the camera-to-object distance only (hereinafter referred to as VA(l)) as shown in FIG. 3(a) and which is then applied to the non-inversion input of the first comparator CP1 of the circuit CC2. At the same time, a voltage $VB(l) = VA(l) - \alpha$ appears at the inversion input of the second comparator CP2 as shown in FIG. 3(a). If the photo-taking lens L is not focused on the object OB, any one of the outputs of the comparators CP1 and CP2 is of low level so that the collector of the transistor Tr1 remains unchanged from high level, and therefore, the light-emitting diode LD1 remains de-energized. Upon rotation of the focusing ring 6 about the optical axis O of the photo-taking lens L, the photo-taking lens L is shifted along the axis O and at the same time, the output voltage of the potentiometer 8 is varied as a function of the lens position. When the photo-taking lens L is focused at a distance in a range of from l to l + β, as will be understood from FIG. 3(b), the output voltage of the potentiometer 8 lies with in a voltage range of from VA(l) to VB(l) so that the outputs of the comparators CP1 and CP2 are simultaneously changed to high level as will be seen from FIG. 3(c) and 3(d). On the other hand, in this state if the brightness level of the object OB is above the lower limit of a dynamic range of light response of the circuit CC1, and therefore if the voltage appearing at a point of conjunction of the resistor R1 and the element 22 is higher than the voltage Vr appearing at the slide Bo of the semi-fixed resistor R10, the output of the comparator CP3 takes high level at which the transistor Tr4 is in conductive state. Thereby, at a time when the outputs of the comparators CP1 and CP2 are simultaneously of high level, the transistors Tr1 and Tr2 are rendered conductive which in turn causes the transistor Tr3 to be conductive as shown in FIG. 3(e) to energize the light-emitting diode LD1. As this light-emitting diode LD1 is positioned to be visible in the camera view finder, the photographer looking through the finder is therefore informed of a fact that the photo-taking lens L is set to a sharpest focus position. As soon as the light-emitting diode LD1 is lighted on, the photographer needs only to remove his hand from the focusing ring 6, and then he may turn to depress a shutter release button not shown.

On the other hand, if the brightness level of the object OB is below the lower limit of the dynamic range of light response of the distance measuring circuit CC1, and therefore the voltage appearing at the conjunction between the resistor R1 and the photoconductive element 22 is lower than that Vr, then the output of the comparator CP3 is of low level at which the transistor Tr4 is in non-conductive state. Therefore, in this case, the outputs of the comparators CP1 and CP2 can not contribute to the conduction of the transistor Tr3, so that any setting of the focusing ring 6 does not lead to the energization of the light emitting diode LD1. Consequently, in this case, the photographer needs at first to turn the focusing ring 6 to place the infinite distance symbol in coincidence with the index 2a, then to depress the button 6b to release the focusing ring 6 from restriction by the not shown restricting mechanism, and then to further turn the ring 6 in the same direction until the ring 6 is automatically arrested in a position where the symbol P is aligned with the index 2a, and where the switch S1 is closed by the projection 4a. Such closure of the switch S1 causes conduction of the transistor Tr7 to start power supply to the pan-focus detecting circuit CC4 and also to the light-emitting diode LD2, thereby the photographer is informed of the fact that the pan-focus detecting circuit CC4 is set in the operative state by the lighted-on of the light-emitting diode LD2. Such conduction of the transistor Tr7 also causes conduction of the transistor Tr8 which in turn retains the conduction of the transistor Tr7 after the switch S1 is opened. After the light-emitting diode LD2 is lighted on, the photographer may turn the focusing ring 6 in the reverse direction from the P position. At a time when the output voltage of the potentiometer 8 lies within a voltage range of VB2 to VB1, the outputs of the comparators CP4 and CP5 change to high level simultaneously at which the transistors Tr5 and Tr6 are rendered conducting and therefore the transistor Tr3 is rendered conducting to energize the light-emitting diode LD1 in the focus indication circuit CC3, thereby the photographer is informed of the fact that the photo-taking lens L is focused at a hyper-focal distance set in the resistor R13 as a function of the size of diaphragm aperture. For example, if the diaphragm value is F 4.0, the photo-taking lens L is focused at a distance of 8.6 meters. This corresponds to a pan-focus range of from 4.3 to infinity. For a principal object at a distance of 4.3 meters, the photo-taking lens L forms an image of that object with an acceptable sharpness on the film plane 30.

In this case, the smaller the size of diaphragm aperture, the wider the pan-focus range becomes. However, the use of a smaller size of diaphragm aperture, at the low brightness of the object will lead to under-exposure of the film. To avoid this, if the size of diaphragm aperture is increased, the pan-focus range is narrowered to decrease the percentage of photographs which are found to be acceptable. On this account, with a general-purpose camera, it is most desirable in practice to combine as a slow shutter speed as possible with as a smaller size of diaphragm aperture as possible so that as a wide pan-focus range as possible can be obtained.

After the setting of the focusing ring 6 to the pan-focus position has been accomplished, the photographer needs to close the switch S2, causing the transistor Tr8 to be rendered non-conductive and then causing the transistor Tr7 to be rendered non-conductive. In this embodiment of FIG. 1, the switch S2 is arranged to be operated manually, but may be otherwise arranged to be closed in response to actuation of a shutter button or a film winding lever not shown.

The light-emitting diode LD2 also may be positioned in the camera view finder. If so, it is preferred to provide suitable means for discriminating the two light-emitting diodes LD1 and LD2 from each other. For example, the first light-emitting diode LD1 emits a blue light, and the second light-emitting diode LD2 emits a red light.

It will be seen from the foregoing description that the first embodiment of the invention enables a photographer to perform the setting of the distance adjusting ring at a proper position even when the satisfactory detection of a sharpest focus can not be fully assured from the automatic focus detecting device.

Figure 3:
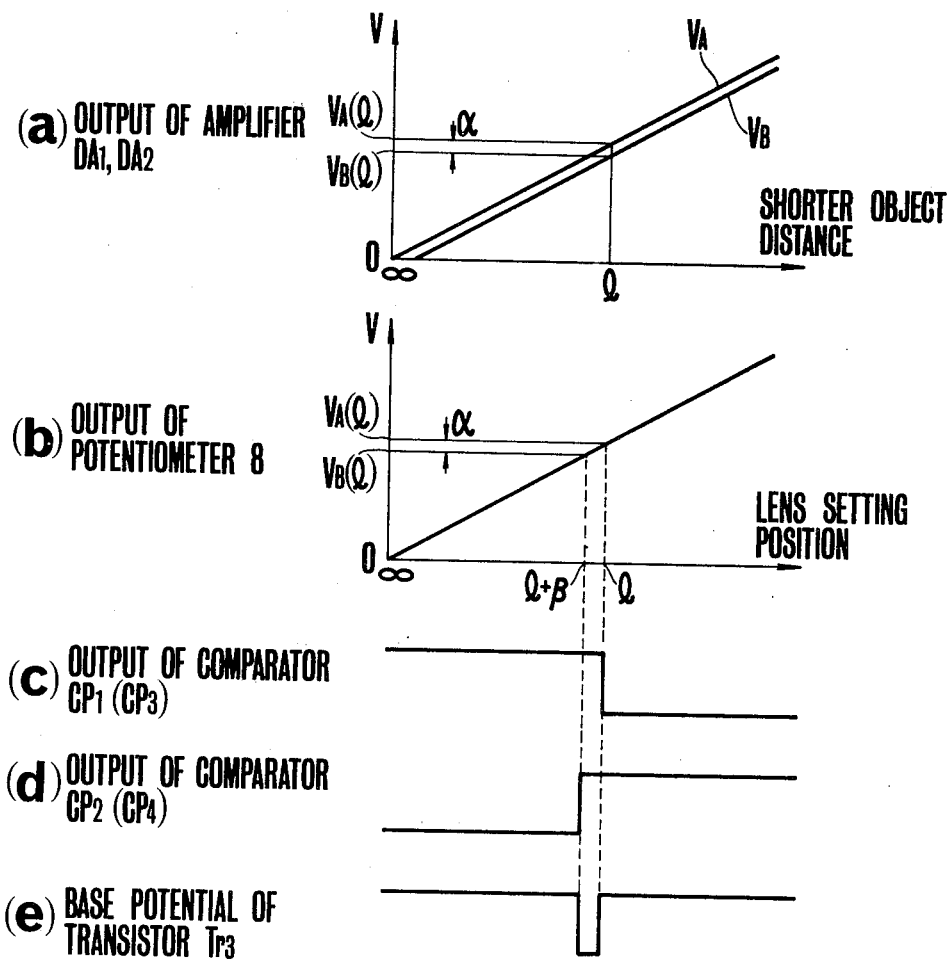
FIGS. 3(a) to 3(e) are diagrams showing the outputs of main circuit blocks in the range detecting circuit and the focus detecting circuit of the embodiment of FIGS. 1 and 2.
Figure 4:
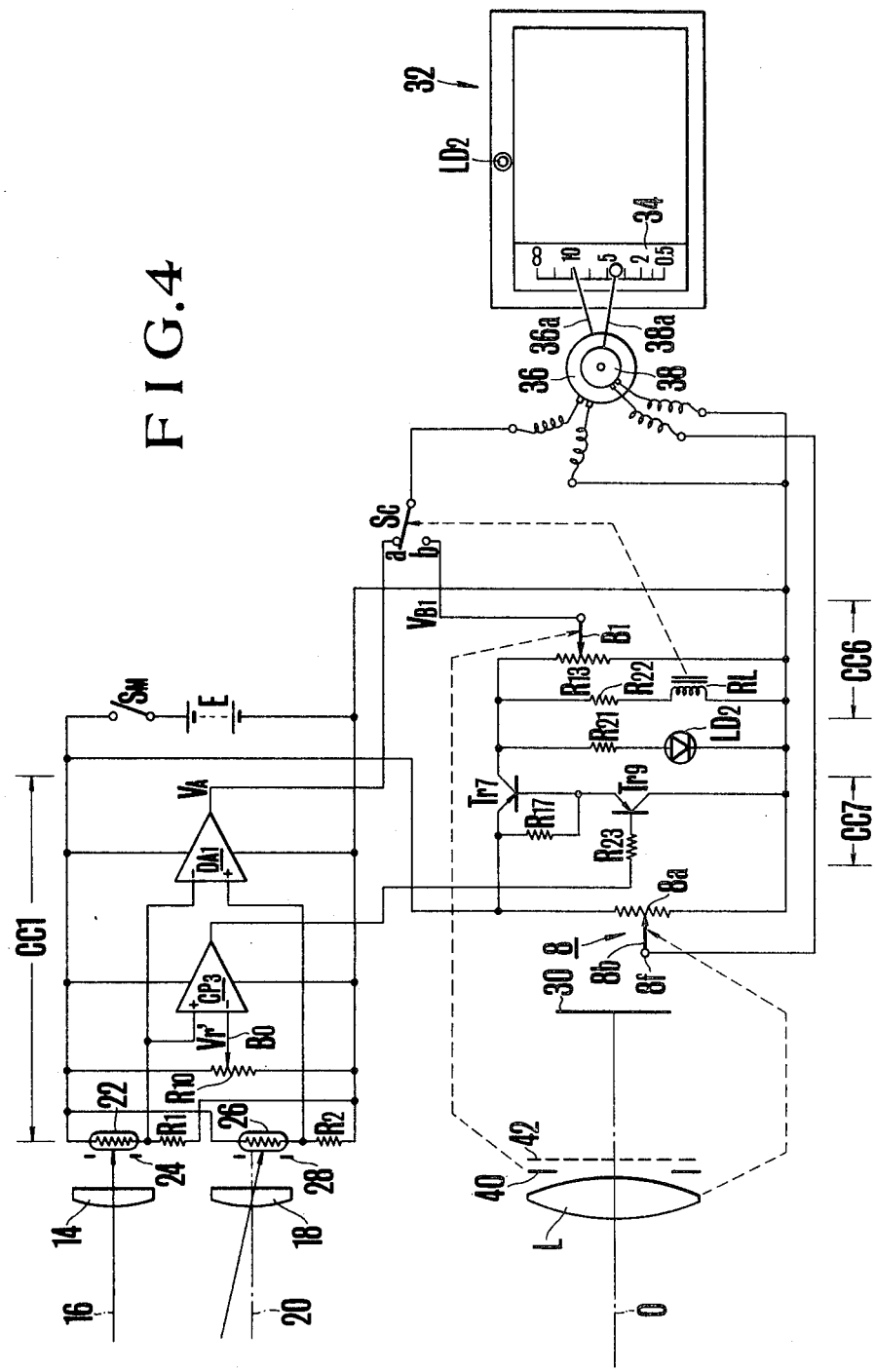
FIG. 4 is a schematic electrical circuit diagram showing a second embodiment of the invention.

FIG. 4 shows a second embodiment of the invention which is different from the first embodiment of FIGS. 1 to 3 in that a hyper-focal distance setting circuit CC6 is automatically rendered operative by a power supply control circuit CC7 when the object brightness lowered below a predetermined level, and that there are provided a pair of meters to enable the photographer to be informed not only of when the lens L is in either sharpest focus position or pan-focus position but also of, if the lens L is not in focus, the direction in which an adjustment must be made to bring the lens L into focus. Therefore, in this embodiment, the focus detection circuit CC2 and the focus indication circuit CC3 are useless.

The two meters 36 and 38 are positioned in concentric relation to each other and have pointers 36a and 38a respectively arranged to be movable over a distance scale 34 in or near the camera view finder 32. A coil of the first meter 36 is connected at one end to the negative bus and at the other end to a pole of a single-pole double-throw switch Sc with a first throw a connected to the output of the differential amplifier DA1 and with a second throw b connected to the slider B1 of the variable resistor 13. The change-over of the pole of the switch Sc is controlled by a relay RL in such a manner that when the output voltage of the comparator CP3 changes from high to low level to render a transistor Tr9 in the power supply control circuit CC7 conductive with simultaneous occurrence of conduction of the transistor Tr7, the relay RL is energized to move the pole of the switch Sc from "a" position to "b" position, where the distance measuring circuit CC1 is cut off from the meter 36 but instead the diaphragm responsive variable resistor R13 for setting a hyper-focal distance is connected thereto. The second meter 38 has a coil connected at one end to the negative bus and at the other end to the output of the potentiometer 8.

Now assuming that the object brightness level is above the lower limit of the dynamic range of light response of the distance measuring circuit CC1, then the voltage appearing at the conjunction of the photoconductive element 22 and the resistor R1 is higher than the V'r (in this case the reference voltage V'r given through the slide Bo is adjusted in correspondence to the lower object brightness level at which the operation of the distance measuring circuit CC1 is insured) appearing at the output of the semi-fixed resistor R10, causing the comparator CP3 to produce an output of high level at which the transistor Tr9 is in non-conductive state, and therefore the transistor Tr7 is in non-conductive state. Accordingly the switch Sc is set in "a" position, where the output of the distance measuring circuit CC1 is applied to the first meter 36 with the deflected position of the pointer 36a indicating a distance between the camera and the object.

While looking through the finder, the photographer needs to turn the focusing ring 6 in a direction such that the pointer 38a of the second meter 38 follows up the first pointer 36. When these two pointers 36a and 38a come to overlap one upon the other, the image formed by the lens L on the film 30 is in sharpest focus.

On the other hand if the object brightness level lowered below the lower limit of the dynamic range, then the output of the comparator CP3 changes to low level at which the transistors Tr9 and Tr7 in the power supply control circuit CC7 are rendered conductive successively to energize the relay RL, thereby the circuit CC1 is cut off from the first meter 36 and instead, the hyper-focal distance setting circuit CC6 is brought into connection therewith through the switch Sc. The deflected position of the pointer 36a is dependent upon the size of diaphragm aperture as schematically shown by a dashed line and represents a hyper-focal distance in cooperation with the distance scale 34. The lens L can be focused at this hyper-focal distance by turning the ring 6 until the pointer 38a coincides with the pointer 36a. It is to be noted that the switches S1 and S2 and the restricting mechanism for the focusing ring 6 of the first embodiment have no use in the second embodiment.

Figure 5:
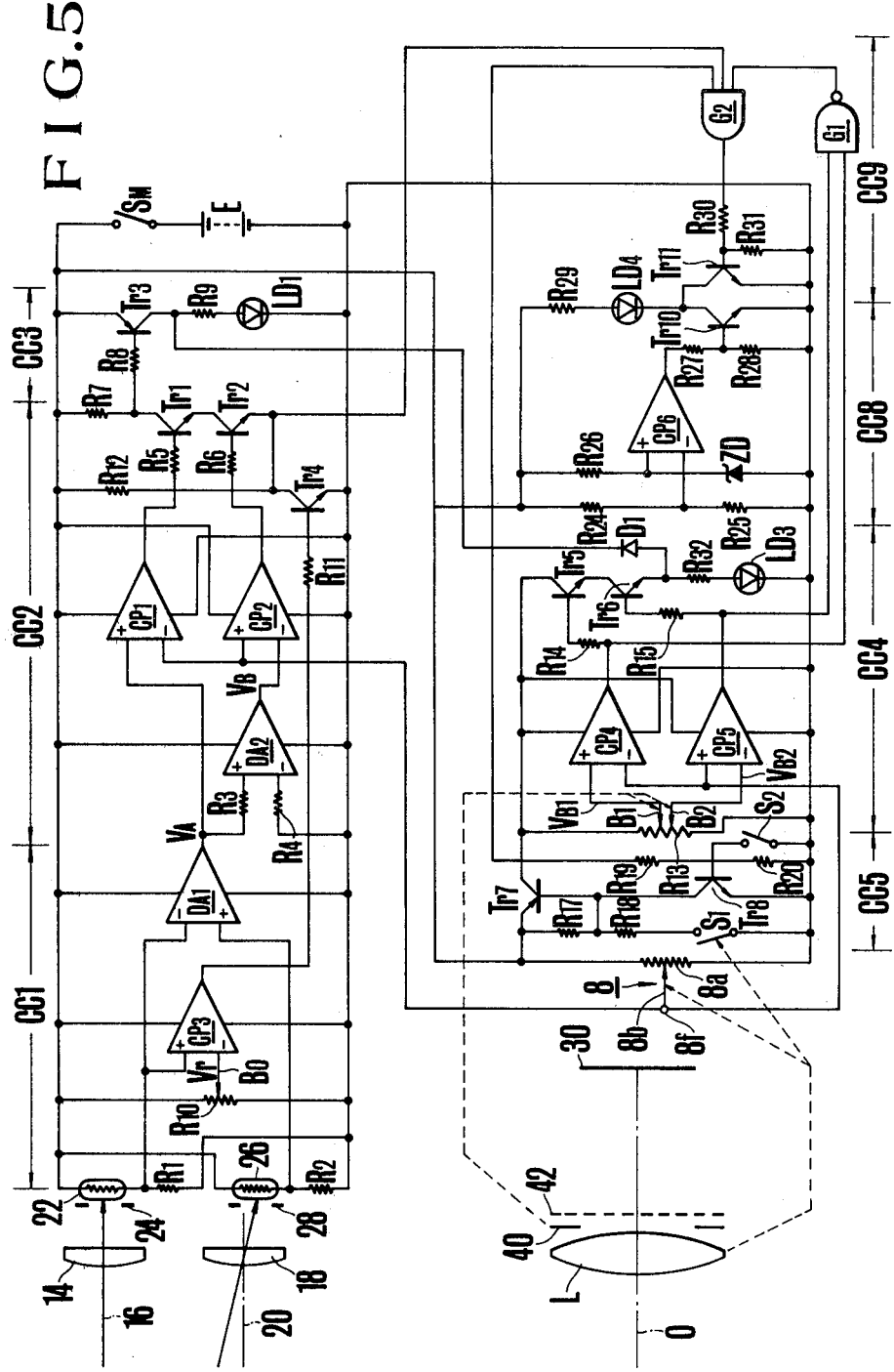
FIG. 5 is a similar diagram showing a third embodiment of the invention.

FIG. 5 shows a third embodiment of the invention which may be considered to be an example of improvement of the first embodiment of FIG. 1 by addition of a voltage drop detecting circuit CC8.

This circuit CC8 comprises a voltage divider consisting of a pair of resistors R24 and R25 and connected across the battery E, a reference voltage source consisting of a resistor R26 and a Zener diode ZD and connected in series to each other between the positive and negative buses, a comparator CP6 having (+) and (−) inputs connected to the outputs of the reference voltage source and the voltage divider respectively, a switching transistor Tr10 with a base connected to a point on connection of resistors R27 and R28 between the output of the comparator CP6 and the negative bus with an emitter connected to the negative bus, and with a collector connected to the cathode of a light-emitting diode LD4 and a resistor R29 connected between the anode of the diode LD4 and the positive bus. Accordingly, when the actual voltage of the battery E is below a voltage level held by the Zener diode ZD, the comparator CP6 produces an output voltage of high level at which the transistor Tr10 is rendered conductive to energize the diode LD4, thus indicating that the actual voltage of the battery E drops below a satisfactory operating level for the distance measuring circuit CC1 and the focus detecting circuit CC2. In this circuit, the reference voltage level to be held by the Zener diode ZD is adjusted by the selection of the resistance value of the resistor R26 to a level of the voltage divider R24, R25 when the voltage level of the battery E lies at a lower level at which the operations of the circuits CC1 and CC2 are insured. The resistor R29 serves as a protection element for the light-emitting diode LD4.

A circuit CC9 is a display control circuit provided for indicating that the hyper-focal distance setting circuit CC4 is rendered operative by the closure of the switch S1 at the state that the object brightness level lowered below the lower limit of a dynamic range of light response of the distance measuring circuit CC1. The circuit CC9 comprises a transistor Tr11 with a collector connected to the collector of the transistor Tr10, with an emitter connected to the negative bus and with a base connected through a resistor R31 to the negative bus, a NAND gate G1 having two inputs connected to the respective outputs of the comparator CP4 and CP5, and an AND gate G2 having three inputs: one is connected to the output of the NAND gate G1; the second is connected to the collector of the transistor Tr4; and the third is connected to the collector of the transistor Tr7. The output of the NAND gate G2 is connected to the base of the transistor Tr11 through a resistor R30.

The pan-focus detecting circuit CC4 of FIG. 5 is slightly different from that of FIG. 1 in that a light-emitting diode LD3 is connected in the emitter stage of the transistor Tr6 together with a protection resistor R32, and that the emitter of the transistor Tr6 is connected through a reverse current preventing diode D1 to a point on connection between the protection resistor R9 for the light-emitting diode LD1 and the collector of the transistor Tr3 in the circuit CC3. Therefore, when the lens L is focused at a hyper-focal distance by the use of the circuit CC4, both of the light-emitting diodes LD1 and LD3 are simultaneously lighted on.

In this construction, if the voltage level of the battery E is above the satisfactory operating level for the circuit CC1 and CC2, the voltage drop detecting circuit CC8 has no effect on the indication by the light-emitting diode LD4. On the other hand, when the voltage level of the battery E drops below the level, the voltage appearing at the conjunction of the resistors R24 and R25 becomes lower than that appearing at the conjunction of the resistor R26 and the Zener diode ZD, causing the output of the comparator CP6 to change to high level at which the transistor Tr10 is rendered conductive to energize the light-emitting diode LD4.

Under this condition, it is possible that the outputs of the comparators CP1 and CP2 of the automatic focus detecting circuit CC2 happen to be of high level simultaneously during focusing operation of the lens L. This will lead to the conduction of the transistors Tr1 and Tr2 (provided that the transistor Tr4 is in conductive state). In this case, the light-emitting diode LD1 is caused to be lighted on. But, since the satisfactory detection of sharpest focus is not assured due to the drop of the voltage of the battery E, it is preferred to make use of the panfocus detecting circuit CC4 in the adjusting of the lens L rather than by the use of the focus detecting circuit CC2.

With such battery unchanged by new one, therefore, the photographer may proceed to turn the focusing ring 6 so as to close the switch S1. And when the lens L is focused at a hyper-focal distance set in the resistor R13, the output voltages of the comparators CP4 and CP5 change to high level simultaneously at which the transistors Tr5 and Tr6 are rendered conductive to energize the light-emitting diode LD3. At the same time, a current flowing through the transistors Tr5 and Tr6 is directed through the diode D1 and the protection resistor R9 to the light-emitting diode LD1 also. As a result, both of the light-emitting diodes LD1 and LD3 are lighted on, informing the photographer of the fact that the photo-taking lens L is set to the pan-focus position.

Though the battery voltage is above the satisfactory operating level, when the object brightness level lowered below the dynamic range of light response of the distance measuring circuit CC1, the pan-focus detecting circuit CC4 is made use of. In this case, since the output of the comparator CP3 is of low level, a voltage of high level appears at the collector of the transistor Tr4 due to the non-conduction thereof, so that the second input of the AND gate G2 is of high level. Next, when the switch S1 is closed by the rearward movement of the sleeve 4, the transistor Tr7 is rendered conductive so that the third input of the AND gate G2 is of high level. And in this state, if the photo-taking lens L is not yet adjusted to the hyper-focal distance position set by the resistor R13, any one of the comparators CP4 and CP5 produces an output of low level, so that the NAND gate G1 produces an output of high level which is applied to the first input of the AND gate G2. Since all the inputs of the AND gate G2 are of high level, the transistor Tr11 is rendered conducting to energize the light-emitting diode LD4, thereby the indication that the pan-focus detecting circuit CC4 is rendered operative, is performed. And thereafter when the lens L is focused at the hyper-focal distance, the output of the comparators CP4 and CP5 becomes of high level simultaneously, so that both of the light-emitting diodes LD1 and LD3 are lighted on, thereby the indication that the lens L is set to the pan-focus position, is performed. At this time, the output of the NAND gate G1 changes to low level, so that the output of the AND gate G2 changes to low level, thereby the transistor Tr11 is rendered non-conductive to light off the light-emitting diode LD4.

The display system of the third embodiment of FIG. 5 may be summarized as follows. The light-emitting diode LD1 when lighted on indicates that the normal operation of focus adjustment has been performed. The light-emitting diodes LD1 and LD3 when lighted on simultaneously indicate that the photo-taking lens L is set to the pan-focus position. On the other hand, the light-emitting diode LD4 when lighted on indicates either that the battery voltage falls below the satisfactory operating level, or that, though the battery voltage is above the level, the object brightness level is below the dynamic range of the distance measuring circuit CC1, while the setting of the lens L to the panfocus position is not accomplished yet.

As all the light-emitting diodes are positioned in the camera view finder, it is desirable that these indications are discriminated from one another as has been mentioned before. For example, if a green light-emitting diode is selected for employment as the light-emitting diode LD1, it is preferred to select orange and red light-emitting diodes as the light-emitting diodes LD3 and LD4 respectively.

Figure 6:
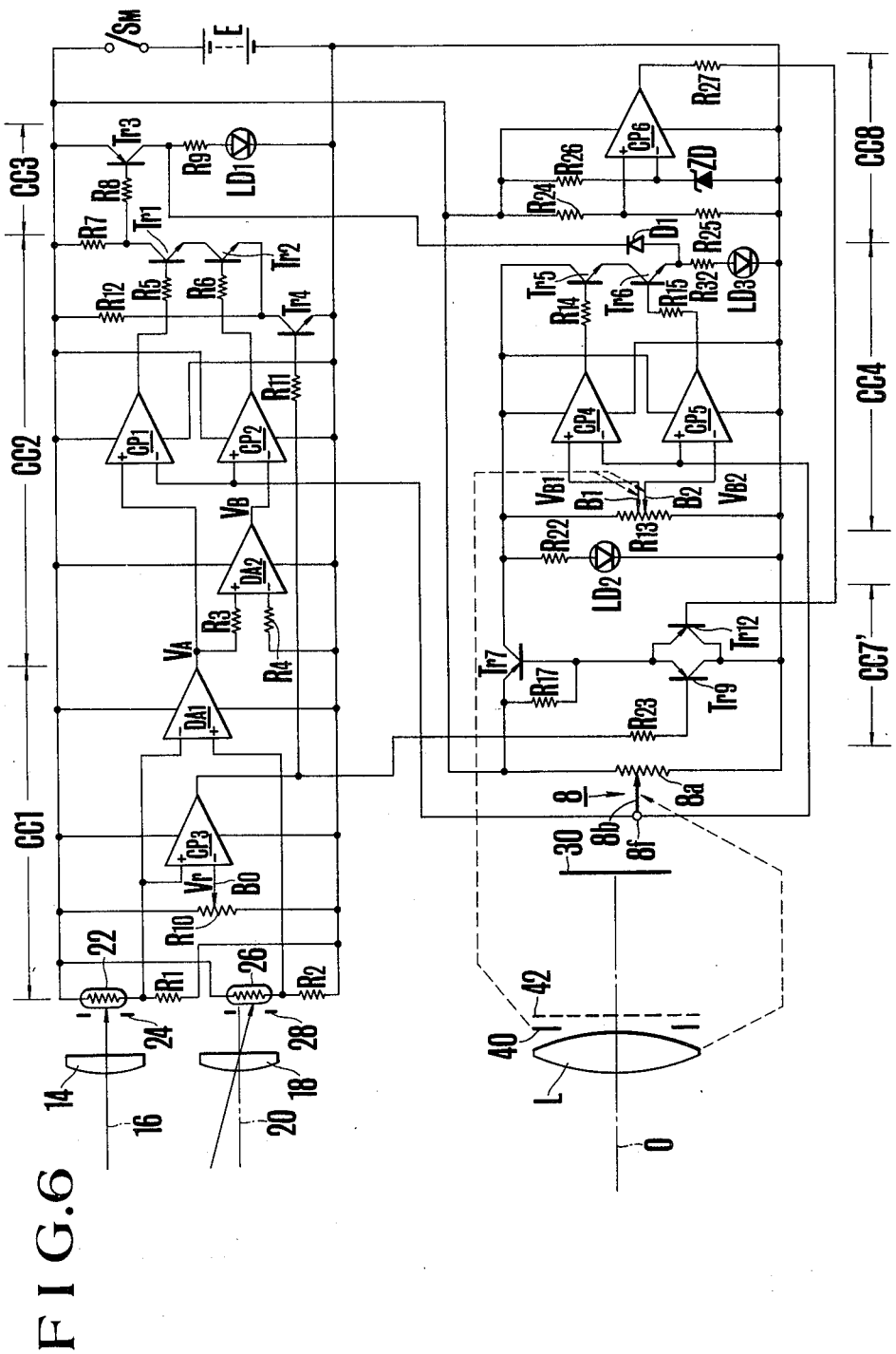
FIG. 6 is a similar diagram showing a fourth embodiment of the invention.

FIG. 6 shows a fourth embodiment of the invention which may be considered to be an example of improvement of the third embodiment of FIG. 5 and where the pan-focus detecting circuit CC4 is automatically rendered operative in response to drop of the object brightness level and/or the battery voltage below the respective predetermined levels. For this purpose, the power supply retaining circuit CC5 of FIG. 5 is modified to a power supply control circuit CC7'. In addition to the power supply control transistor Tr7 and the resistor R17, the circuit CC7' further includes transistors Tr9 and Tr12 with emitters connected to the base of the transistor Tr7, with collectors connected to the negative bus and with bases connected to the output of the comparator CP3 through the resistor R23 and to the output of the comparator CP6 through the resistor R27 respectively. A further modification is that the two inputs of the comparator CP6 is reversed in connection to the voltage divider R24 and R25 and the reference voltage source R26 and ZD, so that when the battery voltage drops below the satisfactory operating level, the output of the comparator CP6 changes from high to low level at which the transistor Tr12 is rendered conductive. Instead of using the light-emitting diode LD4 as a warning display element for the battery voltage drop, the light-emitting diode LD2 is utilized to be connected between the pan-focus detecting circuit CC4 and the circuit CC7', thereby giving an advantage of omitting the display control circuit CC9. Further there is no need to provide the P position and the restricting mechanism for the focusing ring 6, likewise as in the second embodiment of FIG. 4.

When the object brightness level lowered to cause change of the output of the comparator CP3 from high to low level, the first transistor Tr9 is rendered conductive, while when the battery voltage lowered to cause change of the output of the comparator CP6 from high to low level, the second transistor Tr12 is rendered conductive, so that in both cases, the pan-focus detecting circuit CC4 is rendered operative, since the transistor Tr7 is rendered conductive. At the same time, the light-emitting diode LD2 is lighted on to indicate that the pan-focus detecting circuit CC4 is set in the operative state. For this reason, the light-emitting diode LD2 may be regarded as providing a warning indication for either or both of the object brightness and battery voltage drops.

Figure 7:
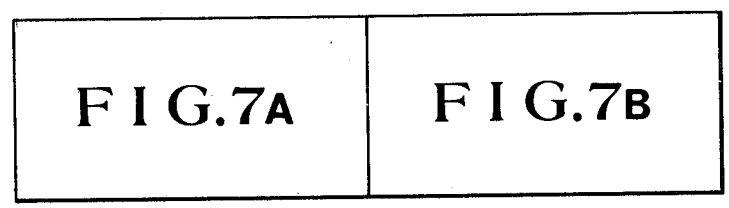
FIG. 7 is a similar diagram showing a fifth embodiment of the invention.
Figure 7A:
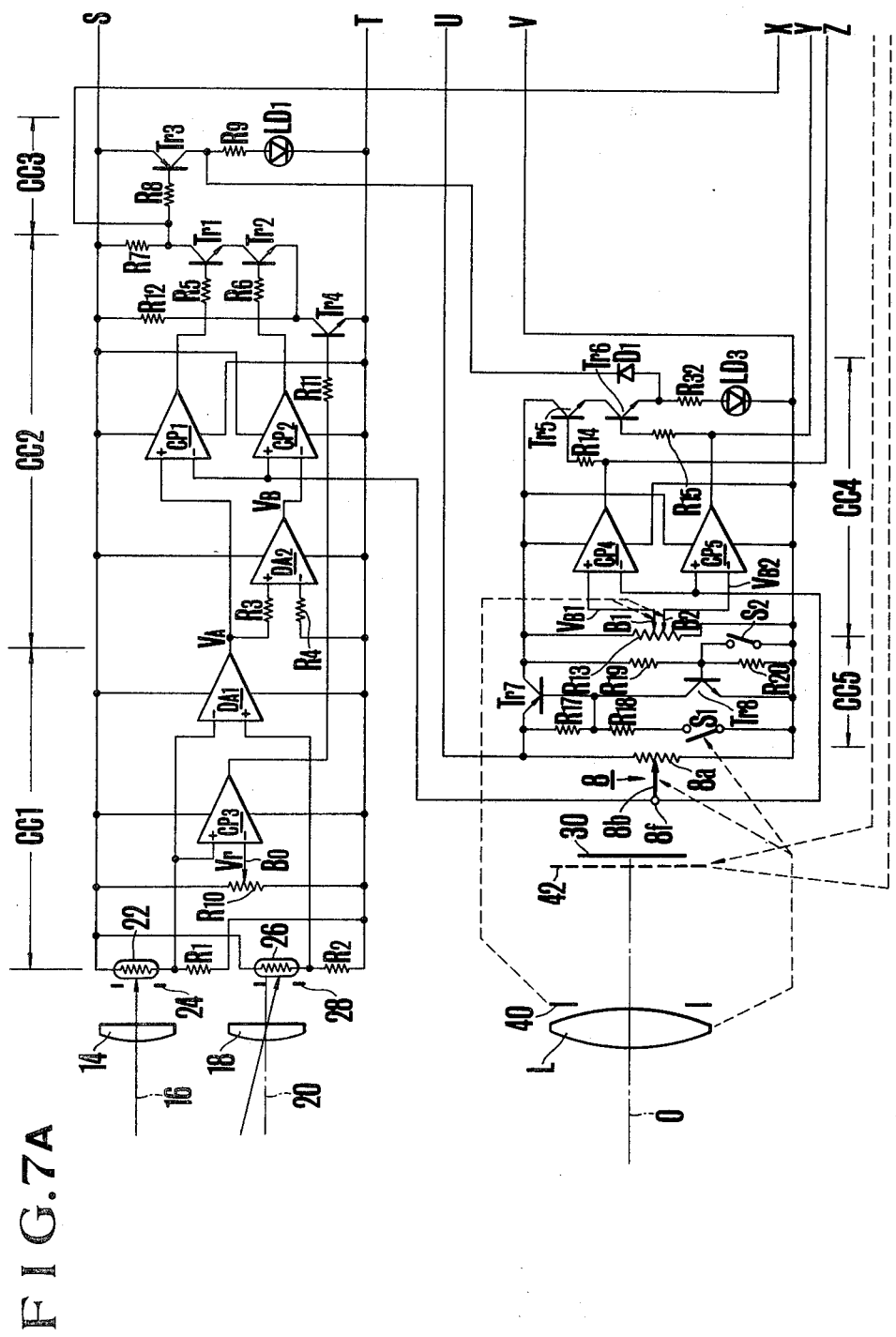
Figure 7B:
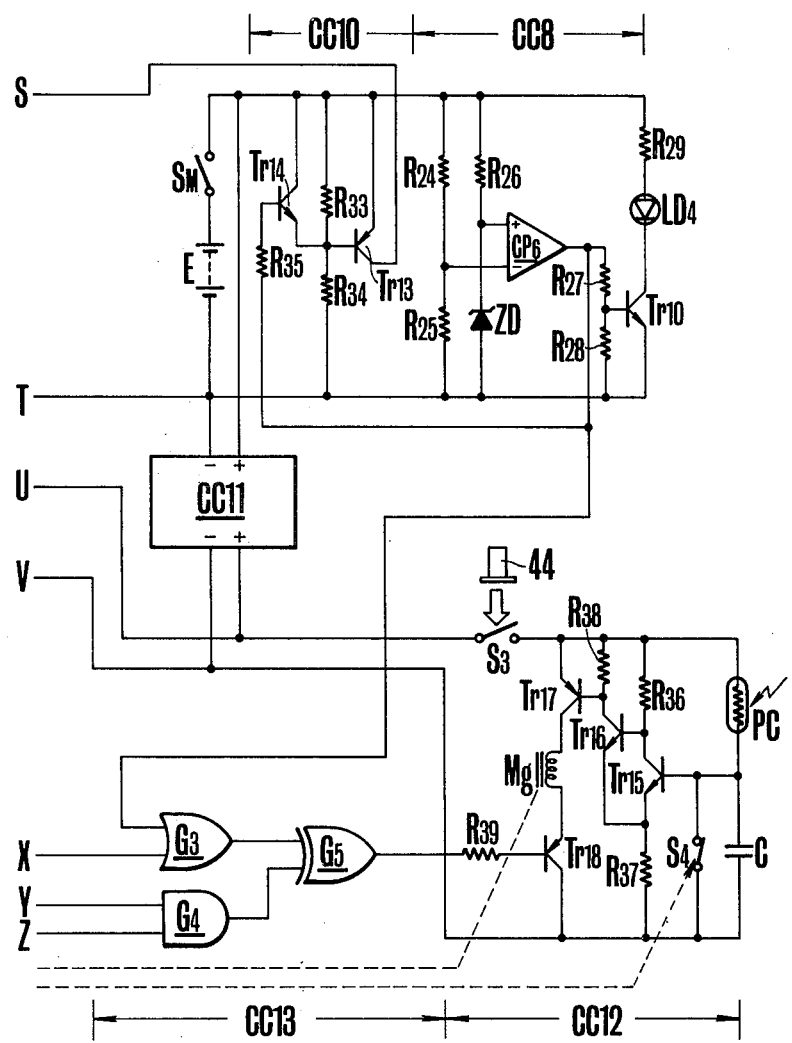

In FIG. 7, there is shown a fifth embodiment of the invention with FIG. 7A being the left-hand portion of a schematic circuit diagram of the camera focusing control device and with FIG. 7B being the righ-hand portion of the circuit and a shutter control circuit. This embodiment is based on the third embodiment of FIG. 5 and adapted to co-operate with the shutter control circuit in such a manner that only when the setting of the photo-taking lens L to a sharpest focus position by the use of the automatic focus detecting circuit CC2 has been completed, or the setting of the photo-taking lens L to a pan-focus position by the use of the pan-focus detecting circuit CC4 has been completed, provided that either or both of the object brightness and battery voltage drops is or are resulted, the shutter control circuit is rendered operative. Further, when the battery voltage lowered below the predetermined level, the power supply to the distance measuring circuit CC1, focus detecting circuit CC2 and indication circuit CC3 is cut off.

A circuit CC10 for controlling power supply to the circuits CC1, CC2 and CC3 comprises a first transistor Tr13 with an emitter connected to the main switch SM, with a collector connected to the positive bus of the circuit of FIG. 7A which is similar to that of FIG. 5 except for omission of the display control circuit CC9, and a base connected to a point on connection between resistors R33 and R34 between the positive and negative buses, and a second transistor Tr14 with a collector connected to the positive bus, with an emitter connected to the point and with a base connected through a resistor R35 to the output of the comparator CP6 of the circuit CC8 which is similar to that of FIG. 5.

A constant voltage circuit CC11 is provided for power supply to the pan-focus detecting circuit CC4 through the power supply control and holding circuit CC5 and also to a shutter control circuit CC12.

The shutter control circuit CC12 comprises a photo-cell PC positioned to receive light from the object to be photographed, a timing capacitor C connected in series to the photo-cell, a Schmitt type trigger circuit consisting of transistors Tr15 to TR17 and resistors R36 to R38 responsive to the output of the timing circuit PC and C for energizing and de-energizing a magnetic winding Mg for controlling opening and closing operation of a shutter 42, a release switch S3 arranged to be closed when a shutter release button 44 is depressed and connected in the positive bus, a time-count start switch S4 arranged to be opened when the shutter is fully opened and connected across the timing capacitor C, and a transistor Tr18 with an emitter connected to the magnetic winding Mg, with a collector connector to the negative bus and with a base connected through a resistor R39 to the output of a logic gating circuit CC13.

The logic gating circuit CC13 is provided for controlling the operation of the shutter control circuit CC12 and comprises an OR gate G3 having two inputs one of which is connected to the output of the comparator CP6 and the other of which is connected to the output of the circuit CC2, an AND gate G4 having two inputs connected to the respective outputs of the comparators CP4 and CP5, and an exclusive OR gate G5 having two inputs connected to the respective outputs of the OR and AND gates G3 and G4.

In this case, the shutter 43 is a focal-plane shutter having leading and rear curtains, and when the magnet Mg is excited the rear curtain is stopped while the engagement of the leading curtain is released and allowed to run so that the shutter is opened. When the magnet Mg is nulfied, the engagement of the rear curtain is released and allowed to run so that the shutter is closed. Also, the film winding-up is prohibited unless the shutter 42 is released. Further, the time-count starting switch S4 is so designed to be released by the leading curtain when the shutter is fully opened. Also the shutter control circuit CC12 is so designed to be supplied with power by the constant voltage circuit CC11 so as to prevent variation in the exposure time due to variation in the voltage of the power source.

In this construction, if the battery voltage is above the satisfactory operating level, the voltage drop detecting circuit CC8 produces an output of low level, so that the transistor TR14 in the power supply control circuit CC10 is rendered non-conductive thereby the transistor Tr13 is rendered conductive to supply the distance measuring circuit CC1, focus detecting circuit CC2 and indication circuit CC3 with electrical power from the battery, provided that the main switch SM is closed. When the brightness level of the object OB is above the predetermined level, the normal focusing by the use of the focus detecting circuit CC2 is possible. With the photo-taking lens L is not focused on the object OB yet, either one of the comparators CP1 and CP2 produces an output of low level so that a voltage of high level appears at the collector of the transistor Tr1. Under this condition, therefore, the OR gate G3 produces an output of high level. Since the pan-focus detecting circuit CC4 is in the inoperative state, the AND gate G4 produces an output of low level. Responsive to these outputs, the exclusive OR gate G5 produces an output of high level at which the shutter control circuit CC12 remains inoperative. In other words, even when the shutter release button 44 is depressed to close the switch S3, the transistor Tr18 is prevented from conducting so that there is no possibility of energizing the magnetic winding Mg, and therefore the shutter remains idle.

When the photo-taking lens L is properly focused on the object OB, both of the comparators CP1 and CP2 produces outputs of high level simultaneously, so that a voltage of low level appears at the collector of the transistor Tr1, thereby the light-emitting diode LD1 is lighted on. At this time, because of the appearance of the voltages of low level at the two inputs of the OR gate G3, the output of the OR gate G3 changes to low level, and therefore the output of the exclusive OR gate G5 changes to low level at which the shutter control circuit is rendered operative. When the shutter release button 44 is depressed, the switch S3 is closed and thereby the transistors Tr17 and Tr18 are rendered conducting to energize the magnetic winding Mg. Then the shutter 42 is opened and when the shutter 42 is fully opened, the start switch S4 is opened to start charging of the timing capacitor C. When the voltage on the capacitor C has reached a predetermined level, the transistor Tr15 is rendered conductive which in turn causes non-conduction of the transisor Tr17, thereby the magnetic winding Mg is deenergized to release a rear curtain of the shutter from latching.

With the battery voltage is above the level, when the object brightness level lowered below the dynamic range of the distance measuring circuit CC1, the transistor Tr4 is rendered non-conductive, so that the voltage appearing at the collector of the transistor Tr1 is maintained at high level, and therefore the output of the OR gate G3 is maintained at high level. In this case, the pan-focus detecting circuit CC4 is made use of. In this state, when the photo-taking lens L is not yet adjusted to the hyper-focal distance position, one of the comparators CP4 and CP5 produces output of low level and therefore the AND gate G4 produces an output of low level. Responsive to these outputs, the exclusive OR gate G5 produces an output of high level at which the shutter control circuit CC12 remains inoperative.

When the lens L is focused at the hyper-focal distance, the outputs of the comparators CP4 and CP5 comes to high level simultaneously, and the light-emitting diodes LD1 and LD3 are lighted on with power supply from the constant voltage circuit CC11. On the other hand, the output of the AND gate G4 changes to high level at which the output of the exclusive OR gate G5 changes to low level, thereby the shutter control circuit CC12 is rendered operative.

Next, when the battery voltage lowered from the level, the output of the comparator CP6 changes to high level at which the light-emitting diode LD4 is lighted on due to the conduction of the transistor Tr10, while the transistor Tr14 is rendered conductive which in turn causes non-conduction of the transistor Tr13, thus the power supply to the circuits CC1, CC2 and CC3 is cut off. Under this condition, the output of the OR gate G3 is maintained at high level. Therefore, so long as the output of the gate G4 remains of low level, the output of the exclusive OR gate G5 is maintained at high level. As a result, even in this case, the shutter control circuit CC12 is prevented from being operative until the lens L is set in the pan-focus position by use of the pan-focus detecting circuit CC4.

It is to be understood that the fifth embodiment of the invention permits the shutter control circuit to be operative only when the photo-taking lens L is properly adjusted to the in focus position by the use of the focus detection circuit CC2 or adjusted to the pan-focus position by the use of the panfocus detecting circuit CC4. Further, the distance measuring circuit CC1, focus detecting circuit CC2 and focus indication circuit CC3 are automatically cut off from the electrical power source when the voltage of the source falls below the satisfactory operating level for these circuits.

Figure 8:
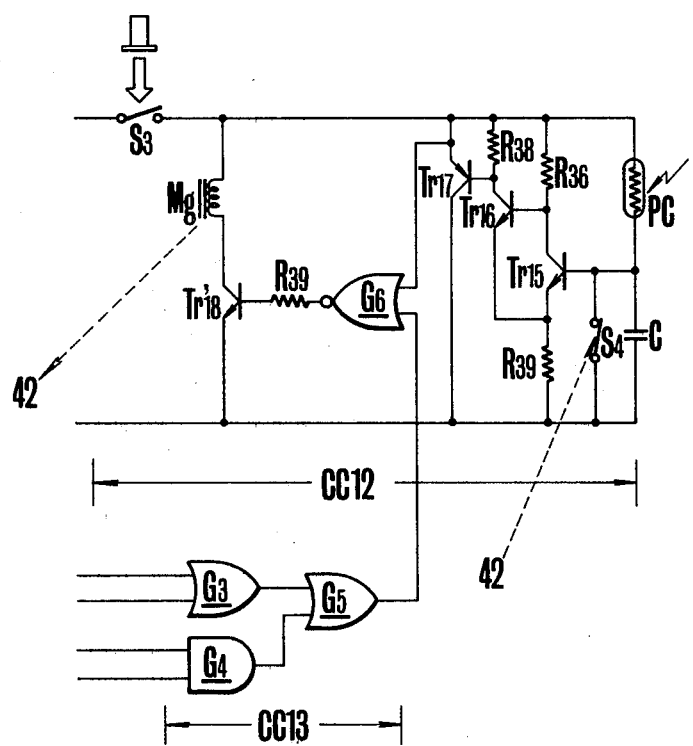
FIG. 8 is a similar diagram showing an example of modification of the fifth embodiment.

FIG. 8 shows an example of modification of the circuit for controlling the operation of the shutter control circuit in accordance with the output of the logic gating circuit. The magnetic winding Mg is provided independently of the Schmitt trigger circuit together with a npn transistor Tr'18, and there is provided a NOR gate G6 between the transistor Tr'18 and the Schmitt trigger circuit, so that only when the two inputs of the NOR gate G6 are of low level simultaneously, it produces an output of high level at which the transistor Tr'18 is rendered conductive.

Figure 9:
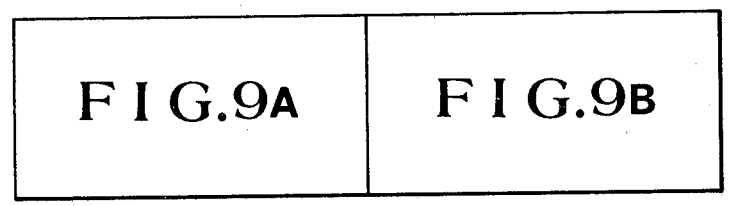
FIG. 9 is a similar diagram showing a sixth embodiment of the invention.
Figure 9A:
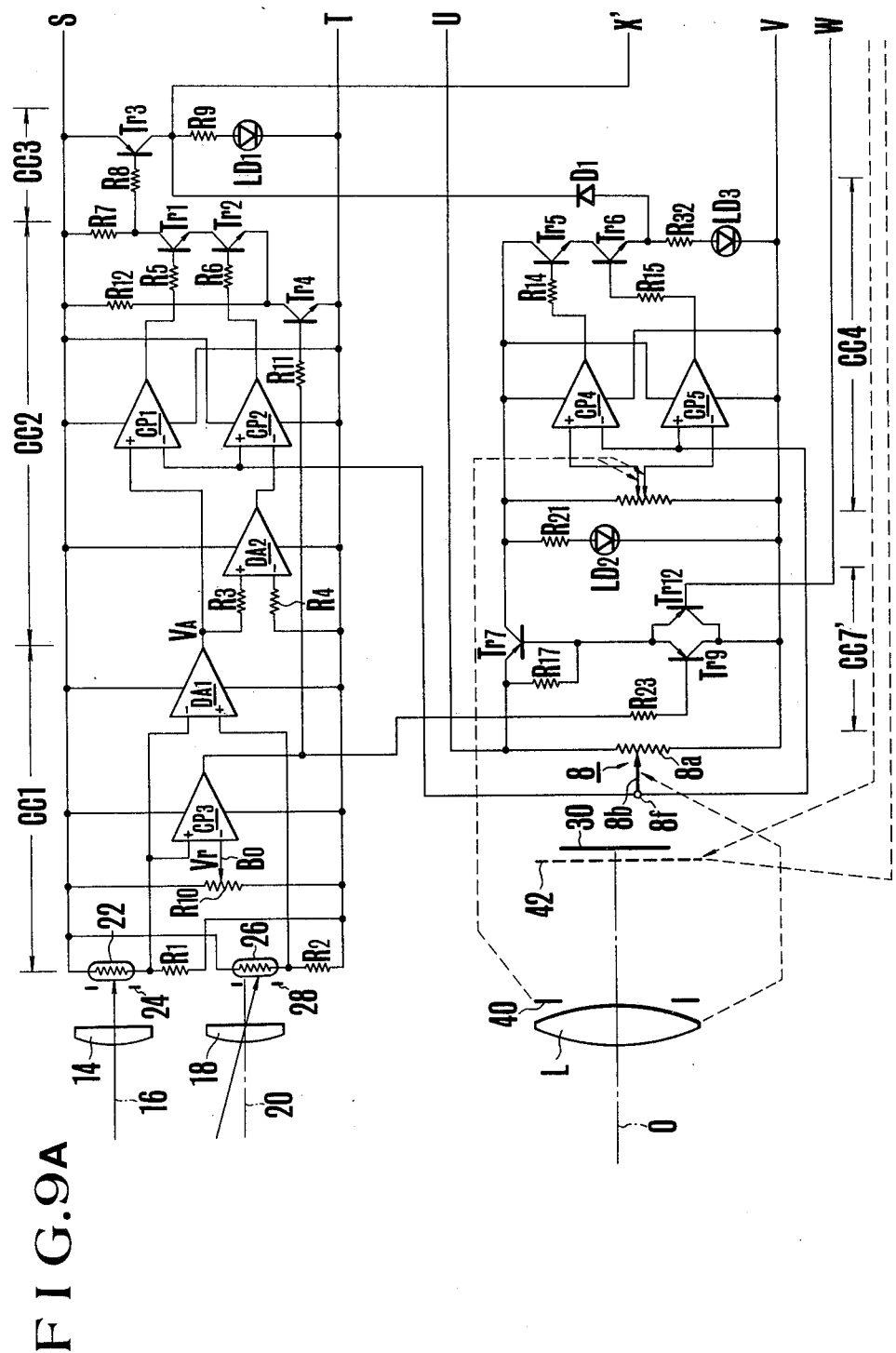
Figure 9B:
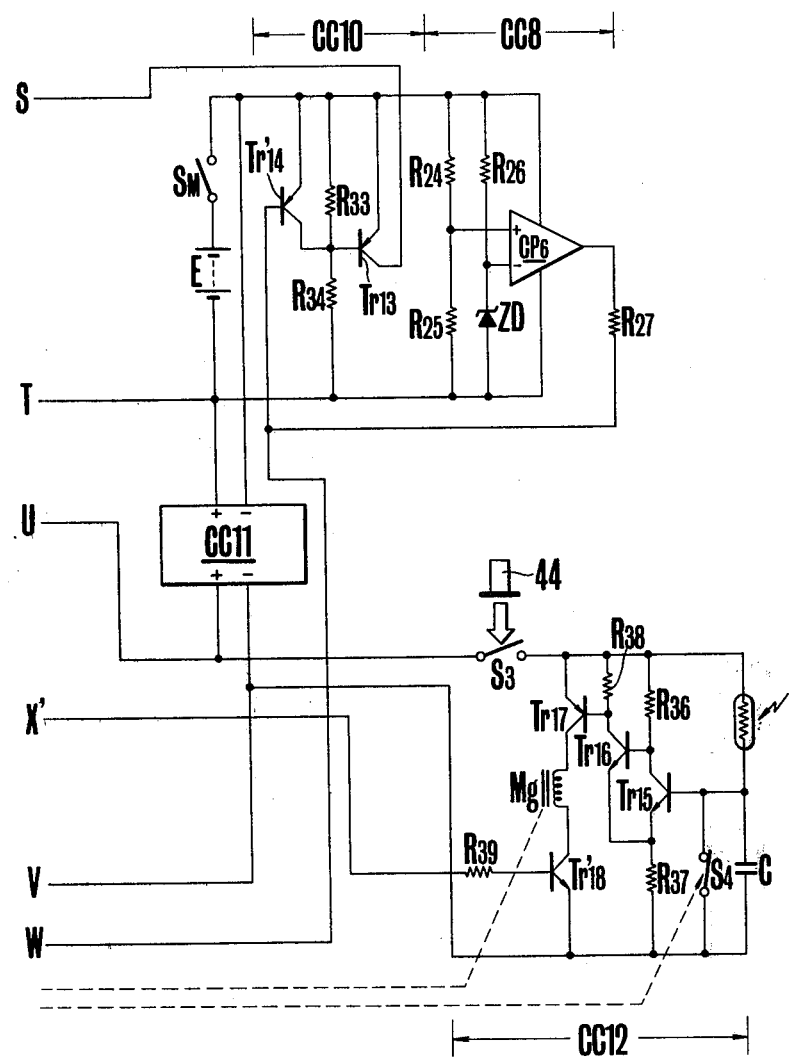

In FIG. 9, there is shown a sixth embodiment of the invention with FIG. 9A being the left-hand portion of a schematic circuit diagram of the camera focusing control device and with FIG. 9B being the right-hand portion of the circuit and a shutter control circuit. This embodiment is based on the fourth embodiment of FIG. 6 and improved in a manner similar to that shown in connection with the fifth embodiment of FIG. 7. For this reason, the parts of this embodiment which are different from those of FIGS. 6 and 7 will be explained below.

At first, the power supply control circuit CC10 makes use of a pnp transistor Tr'14 instead of the npn transistor Tr14 of FIG. 7 becauses the output of the comparator CP6 changes from high to low level when the battery voltage drops below the level.

The shutter control circuit CC12 makes use of a npn transistor Tr'18 shown in FIG. 8 instead of the pnp transistor Tr18 of FIG. 7, and the logic gating circuit CC13 of FIG. 7 is omitted. The base of the transistor Tr'18 is connected through the resistor R39 to the conjunction of the transistor Tr3 and the resistor R9 in the focus indication circuit CC3. The other portion of the circuit of FIG. 9 is similar in construction to that shown in FIG. 7.

In controlling the operation of the shutter control circuit CC12, it is essential that only when the light-emitting diode LD1 is energized, the transistor Tr'18 is rendered conductive to cause the magnetic winding Mg to be controlled by the Schmitt trigger circuit, regardless of whether the focusing operation is performed in a normal or pan-focus manner. It is, of course, that when the battery voltage drop occurs, power supply to the distance measuring circuit CC1, focus detecting circuit CC2 and focus indication circuit CC3 from the battery E are cut off in a similar manner to that shown in connection with FIG. 7.

In any of the above-described embodiments, the focusing ring 6 is operated by the photographer's hand. In final, by reference to FIG. 10, an example of a motor driven focusing control will be explained below. For this purpose, the use of the construction of FIG. 6 or FIG. 9 is particularly advantageous among the above-described embodiments. Therefore, the following description may be considered to disclose an example of improvement of the embodiment shown in FIG. 6 or FIG. 9.

In FIG. 10, Mo is a reversible motor having an output shaft not shown operatively connected to the focusing ring as schematically shown by dashed line. A control circuit for the motor Mo comprises two pairs of transistors Tr19 to Tr22. The emitters of the transistors Tr19 and Tr21 are connected to the positive terminal of the battery E, and the collectors of the transistors Tr20 and Tr22 are connected to the negative terminal of the battery E. The winding of the motor Mo is connected between the collector-emitter conjunction of the transistors Tr19 and Tr21 and that of the transistors Tr20 and Tr22, so that when a current flows in a direction indicated by an arrow F, the motor Mo rotates in a forward direction. Conversely, when a current flows in a direction indicated by an arrow B, the motor Mo rotates in a reverse direction. The bases of the transistors Tr19 and Tr20 are connected through a common protection resistor R40 to reverse current preventing diodes D2 and D4 and therefrom connected to the first comparator CP1 in the automatic focus detecting circuit CC2 and the first comparator CP4 in the pan-focus detecting circuit CC4 at their outputs respectively. The bases of the transistors Tr21 and Tr22 are connected through a common protection resistor R41 to reverse current preventing diodes D3 and D5 and therefrom connected to the second comparator CP2 in the focus detecting circuit CC2 and the second comparator CP5 in the pan-focus detecting circuit CC4 at their outputs respectively. Tr23 is an output cutting transistor with a collector connected to the negative terminal of the battery E, with an emitter connected to the conjunction of the diode D2 and the comparator CP1 and also to the conjunction of the diode D3 and the comparator CP2, and with a base connected through a resistor to the output of the comparator CP3. In this construction, when the object brightness drop occurs to cause change of the output of the comparator CP3 to low level, the transistor Tr23 is rendered conductive thereby the outputs of the comparators CP1 and CP2 are forcibly made low.

The operation of the motor control circuit is as follows: With the pan-focus detecting circuit CC4 rendered inoperative, when the output of the comparator CP1 changes to low level, the transistors Tr19 and Tr20 are rendered conductive to cause a current to flow through the motor winding in F direction so that the motor Mo rotates in the forward direction. When the output of the comparator CP2 changes to low level, the transistors Tr21 and Tr22 are rendered conductive to cause a current to flow through the motor winding in B direction so that the motor Mo rotates in the reversed direction. When the outputs of the comparators CP1 and CP2 are of high level simultaneously, all the transistors Tr19 to Tr22 are rendered non-conductive to cause the motor Mo to be cut off from the battery E, thereby the motor Mo gets stopped. On the other hand, with the pan-focus detecting circuit CC4 rendered operative (in this case the outputs of the comparators CP1 and CP2 are cut off due to the conduction of the transistor Tr23 or the cutting off of the power supply to the circuits CC1, CC2 and CC3.), when the output of the comparator CP4 changes to low level, the transistors TR19 and Tr20 are rendered conductive so that the motor Mo rotates in the forward direction. When the output of the comparator CP5 changes to low level, the transistors Tr21 and Tr22 are rendered conductive so that the motor Mo rotates in the reversed direction. When the outputs of the comparators CP4 and CP5 change to low level simultaneously, all the transistors Tr19 to Tr22 are rendered non-conductive, thereby the motor Mo is stopped. In this case, as mentioned before, the low level output of the comparator CP1 means that the lens L is deviated from proper focus position toward shorter distance position, and the low level output of the comparator CP2 means that the lens L is deviated from proper focus position toward longer distance position.

On the other hand, the low level output of the comparator CP4 means that the lens L is deviated from pan-focus position toward shorter distance position, and the low level output of the comparator CP5 means that the lens L is deviated from pan-focus position toward longer distance position. Accordingly, if the motor Mo is operatively connected to the focusing ring 6 in such a manner that when the motor Mo rotates in the forward direction, the lens L is moved toward infinite focusing position, and when in the reversed direction the lens L is driven for movement toward close-up focusing position, the fully automatic adjustment of the lens L is properly performed.

As has been described above, according to improvements of the present invention, even when the satisfactory operation of the automatic focus detecting device or automatic focus adjusting device is not fully assured due to the object brightness level drop or battery voltage drop, it is made possible to effect approximate adjustment of focus on an object to be photographed and therefore to make photography under such a focusing condition for the object as to be permissible focusing condition. Therefore, in the camera provided with an automatic focus detecting device or automatic focus adjusting device, the relief provision according to the present invention is very advantageous in saving an unacceptable failure of focusing resulting from the unsatisfactory operation of these devices, and is proven to assure an improved performance of this type camera.

According to further improvements of the present invention, the exposure control system in the camera can operate only when the camera objective lens is in sharpest focus or in pan-focus, thereby the percentage of photographs taken with an unacceptable focusing condition is greatly decreased. The camera embodying the present invention is far more fool proof in this sense than was previously possible. In the illustrated embodiments of the invention, such fool proof means is constructed in the electrical form, but may be mechanical, for example, the shutter release button is locked in response to detection of improper focus. Many other variations are possible within the scope and spirit of the present invention.

As understood from the description of the embodiments of the present invention, the approximate focus position to which the camera objective lens is adjusted may coincide with the exact in-focus position when the supplementary device according to the present invention is used.

What is claimed is:

1. A camera comprising:
    objective lens means adjustable along an optical axis for focusing on an object;
    focus detecting means for detecting the focusing condition of the lens means relative to the object and for providing an output representing the focusing condition of the lens means relative to the object;
    supplementary means operable instead of said focus detection means for providing, when operated, an output representing an approximate focusing condition of the lens means relative to the object;
    condition detecting means for detecting whether the condition for operation of the focus detection means can insure the proper operation of the focus detection means and providing a characteristic output when detecting that the condition cannot insure the proper operation of the focus detection means;

output control means for controlling the provision of the output of the focus detection means, said output control means being responsive to the characteristic output of the condition detecting means and for prohibiting the output of the focus detection means in response to said characteristic output of the condition detecting means;

manually operable control means adapted for setting said supplementary means to an operative state; and exposure operation control means for controlling the exposure operation of the camera, said exposure operation control means being responsive to the outputs of said focusing detection means and said supplementary means and enabling the exposure operation of the camera only when said lens means is set to the focused position based on the output of said focus detection means or set to the approximately focused position based on the output of said supplementary means.

2. A camera according to claim 1, wherein said supplementary means includes pan-focus means rendering it possible to set said lens means to a pan-focus position.

3. A camera according to claim 2, further comprising:
diaphragm means for regulating an exposure aperture;
said pan-focus means being operatively associated with said diaphragm means so that the pan-focus position of the lens means is varied in accordance with the change in the size of the exposure aperture regulated by the diaphragm means.

4. A camera according to claim 1, wherein
said condition detecting means includes a brightness detecting circuit for detecting whether the brightness of the object is above an adequate level which can insure the proper operation of said focus detection means and for providing the characteristic output when the brightness of the object drops below said adequate level; and wherein
said output control means is electrically coupled to said brightness detecting circuit and prohibits the provision of the output of the focus detection means in response to said characteristic output of the brightness detecting circuit.

5. A camera according to claim 4, wherein
said condition detecting means further includes a voltage detecting circuit for detecting whether the voltage of a power to be supplied to said focus detection means is over an adequate level which can insure the proper operation of said focus detection means and for providing said characteristic output when said voltage of the power drops below said adequate level; and wherein
said output control means is electrically coupled to said voltage detecting circuit and prohibits the provision of the output of the focus detection means to the output means in response to said characteristic output of the voltage detecting circuit.

6. A camera according to claim 5, wherein said output control means includes a power supply control circuit for controlling the power to said focus detection means,
said power supply control circuit being electrically connected to said voltage detecting circuit to interrupt the power supply to said focus detection means in response to the characteristic output of said voltage detecting circuit so as to prohibit the provision of the output of the focus detection means to the output means.

7. A camera according to claim 1, wherein
said condition detecting means includes a voltage detecting circuit for detecting whether the voltage to be supplied to said focus detection means is over an adequate level which can insure the proper operation of said focus detection means and for providing the characteristic output when the voltage of the power drops below said adequate level; and wherein
said output control means is electrically coupled to said voltage detecting circuit and prohibits the provision of the output of the focus detection means in response to said characteristic output of the voltage detecting circuit.

8. A camera according to claim 7, wherein
said output control means includes a power supply control circuit for controlling power supply to said focus detection means,
said power supply control circuit being electrically connected to said voltage detecting circuit to interrupt the power supply to said focus detection means in response to the characteristic output of said voltage detecting circuit so as to prohibit the provision of the output of the focus detection means.

9. A camera according to claims 5, 6, 7, or 8, wherein said exposure operation control means includes:
means responsive to said characteristic output of said voltage detecting circuit to prohibit the exposure operation of the camera; and
means for enabling the exposure operation of the camera when the lens means is set to the approximately focused position based on the output of the supplementary means when the voltage of the power drops below said adequate level.

10. A camera according to claim 1, further comprising:
indication means responsive to said characteristic output of said condition detecting means to indicate that the condition for operation of the focus detection means cannot insure the proper operation of the focus detection means.

11. A camera according to claim 1, wherein
said lens means is manually settable to a predetermined position beyond a normal focusing range;
said manually operable control means includes a detecting switch arranged to be actuated when said lens means is set to said predetermined position, and
a control circuit responsive to the actuation of said detecting switch to set said supplementary means to the operative state.

12. A camera according to claim 11, further comprising:
indication means coupled to said control circuit to indicate that the supplementary means is set to the operative state.

13. A camera according to claim 1, further comprising:
exposure means for exposing a film to a scene light;
wherein said exposure operation control means is electrically connected with said exposure means so as to restrict the operation of the exposure means.

14. A camera according to claim 13, wherein said exposure means includes:
a shutter operable for exposing the film; and
a shutter control circuit for controlling the operation of said shutter; and wherein
said exposure operation control means is electrically connected with said shutter control circuit so as to restrict the shutter control operation of the shutter control circuit.

15. A camera according to claim 1, further comprising:
output means responsive to the output of the focus detection means and to the output of the supplementary means for providing a first indication representing the focusing condition of the lens means to the object in response to the output of the focus detection means and a second indication representing the approximate focusing condition of the lens means to the object in response to the output of the supplementary means;
said output control means controlling the provision of the output of the focus detection means to said output means and prohibiting the provision of the output of the focus detection means to the output means in response to the characteristic output of said condition detecting means.

16. A camera according to claim 15, wherein said output means includes an indication member coupled to said focus detection means and to said supplementary means to provide said first and second indications.

17. A camera according to claim 15, wherein said output means includes a first indication member coupled to said focus detection means and to said supplementary means to provide said first and second indications and a second indication member coupled to said supplementary means to provide said second indication together with said first indication member.

18. A camera comprising:
objective lens means adjustable along an optical axis so as to focus onto an object;
focus detection means for detecting the focusing condition of the lens means to the object and providing an output representing the focusing condition of the lens means to the object;
supplementary means operable instead of said focus detecting means for providing, when operated, an output representing the approximate focusing condition of the lens means to the object;
condition detecting means for detecting whether the condition for operation of the focus detection means can insure the proper operation of the focus detection means and providing a characteristic output when detecting that the condition cannot insure the proper operation of the focus detection means;
first control means for controlling the provision of the output of the focus detection means, said first control means being responsive to the characteristic output of the condition detecting means and prohibiting the provision of the output of the focus detection means in response to said characteristic output of the condition detecting means;
second control means for controlling said supplementary means, said second control means being responsive to said characteristic output of said condition detecting means and setting the supplementary means to an operative state in response to said characteristic output; and
third control means for controlling the exposure operation of the camera, said third control means being responsive to the outputs of said focus detection means and said supplementary means for enabling the exposure operation of the camera only when said lens means is set to the focused position based on the output of said focus detection means or set to the approximately focused position based on the output of said supplementary means.

19. A camera according to claim 18, wherein said supplementary means includes pan-focus means rendering it possible to set said lens means to a pan-focus position.

20. A camera according to claim 19, further comprising:
diaphragm means for regulating an exposure aperture; wherein
said pan-focus means is operatively associated with said diaphragm means so that the pan-focus position of the lens means is varied in accordance with the change in the size of the exposure aperture regulated by the diaphragm means.

21. A camera according to claim 18, wherein
said condition detecting means includes a brightness detecting circuit for detecting whether the brightness of the object is above an adequate level which can insure the proper operation of the focus detection means and for providing said characteristic output when the brightness of the object drops below said adequate level;
said first control means is electrically coupled to said brightness detecting circuit for preventing the output of said focus detection means in response to said characteristic output of the brightness detecting circuit; and
said second control means is electrically coupled to said brightness detecting circuit and sets said supplementary means to the operative state in response to said characteristic output of the brightness detecting circuit.

22. A camera according to claim 21, wherein
said condition detecting means further includes a voltage detecting circuit for detecting whether the voltage of a power to be supplied to said focus detection means is over an adequate level which can insure the proper operation of said focus detection means and for providing said characteristic output when said voltage of the power drops below said adequate level;
said first control means is electrically coupled to said voltage detecting circuit for preventing the output of said focus detection means in response to said characteristic output of the voltage detecting circuit; and
said second control means is electrically coupled to said voltage detecting circuit and sets said supplementary means to the operative state in response to said characteristic output of the voltage detecting circuit.

23. A camera according to claim 22, wherein
said first control means includes a power supply control circuit for controlling power supply to said focus detection means,
said power supply control circuit being electrically connected to said voltage detecting circuit to interrupt the power supply to said focus detection means in response to the characteristics output of said voltage detecting circuit so as to prohibit the provision of the output of the focus detection means.

24. A camera according to claim 18, wherein
said condition detecting means includes a voltage detecting circuit for detecting whether the voltage of a power to be supplied to said focus detection means is over an adequate level which can insure the proper operation of said focus detection means and for providing said characteristic output when the voltage of the power drops below said adequate level;
said first control means is electrically coupled to said voltage detecting circuit for preventing the output of said focus detection means in response to said characteristic output of the voltage detecting circuit; and said second control means is electrically coupled to said voltage detecting circuit and sets said supplementary means to the operative state in response to said characteristic output of the voltage detecting circuit.

25. A camera according to claims 22, 23, 24, or 26, wherein said third control means includes:
means responsive to said characteristic output of said voltage detecting circuit to prohibit the exposure operation of the camera; and
means for enabling the exposure operation of the camera when the lens means is set to the approximately focused position based on the output of the supplementary means when the voltage of the power drops below said adequate level.

26. A camera according to claim 24, wherein
said output control means includes a power supply control circuit for controlling power supply to said focus detection means,
said power supply control circuit being electrically connected to said voltage detecting circuit to interrupt the power supply to said focus detection means in response to said characteristics output of said voltage detecting circuit so as to prevent the provision of the output of the focus detection means to the output means.

27. A camera according to claim 18, further comprising:
indication means responsive to said characteristic output of said condition detecting means to indicate that the condition for operation of the focus detection means cannot insure the proper operation of the focus detection means.

28. A camera according to claim 18, further comprising:
indication means coupled to said control means to indicate that the supplementary means is set to operate.

29. A camera according to claim 18, further comprising:
exposure operation control means for controlling the exposure operation of the camera,
said control means being responsive to the outputs of said focus detection means and said supplementary means for enabling the exposure operation of the camera only when said lens means is set to the focused position based on the output of said focus detection means or set to the approxiate focus position based on the output of said supplementary means.

30. A camera according to claim 29, further comprising:
exposure means for exposing a film to a scene light;
said exposure operation control means being electrically connected with said exposure means so as to restrict the operation of the exposure means.

31. A camera according to claim 30, wherein said exposure means includes:
a shutter operable for exposing the film;
a shutter control circuit for controlling the operation of said shutter; and wherein
said exposure operation control means is electrically connected with said shutter control circuit so as to restrict the shutter control operation of the shutter control circuit.

32. A camera according to claim 18, further comprising:
adjusting means for automatically adjusting the lens means along the optical axis, said adjusting means being operatively coupled to the lens means and while electrically coupled to the focus detection means and the supplementary means and adjusting the lens means on the basis of the outputs of the focus detection means and the supplementary means.

33. A camera according to claim 18, further comprising:
output means responsive to the output of the focus detection means and to the output of the supplementary means for providing a first indication representing the focusing condition of the lens means to the object in response to the output of the focus detection means and a second indication representing the approximate focusing condition of the lens means to the object in response to the output of the supplementary means;
said first control means being arranged for controlling the provision of the output of the focus detection means to said output means and for prohibiting the provision of the output of the focus detection means to the output means in response to the characteristic output of said condition detecting means.

34. A camera according to claim 33, wherein
said output means includes an indication member coupled to said focus detection means and to said supplementary means to provide said first and second indications.

35. A camera according to claim 33, wherein
said output means includes a first indication member coupled to said focus detection means and to said supplementary means to provide said first and second indications and a second indication member coupled to said supplementary means to provide said second indication together with said first indication member.

36. A camera comprising:
objective lens means adjustable along an optical axis so as to focus onto an object;
focus detection means for detecting the focusing condition of the lens means to the object, said focus detection means providing an output representing the focusing condition of the lens means to the object;
supplementary means for providing an output representing the approximate focusing condition of the lens means to the object;
condition detecting means for detecting whether condition for operation of the focus detection means can insure the proper operation of the focus detection means and for providing a characteristic output when detecting that the condition cannot insure the proper operation of the focus detection means;
selecting means for selecting the output between the output of said focus detection means and the output of said supplementary means, said selecting means being responsive to the characteristic output of said condition detecting means and normally selecting the output of the focus detecting means while selecting the output of the supplementary means in response to said characteristic output of the condition detecting means; and
exposure operation control means for controlling the exposure operation of the camera, said exposure operation control means being responsive to the selected output selected by said selecting means and enabling the exposure operation of the camera only when said lens means is set to the focused position or the approximately focused position based on the selected output selected by the selecting means.

37. A camera according to claim 36, wherein
said condition detecting means includes a voltage detecting circuit for detecting whether the voltage to be supplied to said focus detection means is above an adequate level which can insure the proper operation of said focus detection means and for providing the characteristic output when the voltage of the power drops below said adequate level; and wherein said selecting means is responsive to the characteristic output of said voltage detecting circuit for selecting the output of said supplementary means in response to said characteristic output.

38. A camera according to claim 37, wherein said selecting means includes:

means responsive to the characteristic output of said voltage detecting circuit to interrupt power supply to said focus detection means so as to prohibit the provision of the output of the focus detection means for the output selection; and means responsive to the characteristic output of said voltage detecting circuit to set said supplementary means operative for the output selection.

39. A camera according to claims 37 or 38, wherein said exposure operation control means includes:

means responsive to said characteristic output of said voltage detecting circuit to prohibit the exposure operation of the camera; and means for enabling the exposure operation of the camera when the lens means is set to the approximately focused position based on the output of the supplementary means under the condition of the voltage of the power dropping below said adequate level.

40. A camera comprising:

objective lens means adjustable along an optical axis for focusing on an object;

exposure means operable for exposing a film to light coming from the object and through said lens means;

focus detecting means for detecting the focus of said lens means with respect to the object and for producing a first characteristic output indicative of a properly focused condition of the lens means relative to the object when the lens means is positioned at a properly focused position relative to the object;

supplementary means operable for providing an approximate focus of the lens means to the object and for producing a second characteristic output indicative of an approximately focused condition of the lens means relative to the object when the lens means is positioned at an approximately focused position relative to the object;

first control means for controlling the operation of said supplementary means, said first control means being arranged to render the supplementary means operative so as to provide the approximate focus of the lens means upon the object when the focus detecting means is incapable of accurate detection of the proper focus of the lens means to the object; and second control means for controlling the operation of said exposure means, said second control means being responsive to each of said first characteristic output of said focus detecting means and said second characteristic output of said supplementary means for prohibiting the operation of the exposure means till at least one of the first and second characteristic outputs is produced from one of the focus detection means and the supplementary means.

41. A camera according to claim 40, wherein said first control means includes:

means for detecting whether the voltage level of power to be supplied to said focus detecting means is over a predetermined level which can insure the accurate focus detecting operation of the focus detecting means, said voltage level detecting means being arranged for producing a third characteristic output when detecting that the voltage level of the power drops below said predetermined level; and means responsive to said third characteristic output of said voltage level detecting means to render said supplementary means operative; and wherein said second control means includes:

means responsive to said third characteristic output of said voltage level detecting means to prohibit the operation of said exposure means; and means responsive to said second characteristic output of said supplementary means to enable the operation of the exposure means when said voltage level of the power drops below said predetermined level.

42. A camera according to claim 41, further comprising:

means responsive to said third characteristic output of said voltage level detecting means to render said focus detecting means inoperative.

43. A camera comprising:

objective lens means adjustable along an optical axis for focusing on an object;

exposure means operable for exposing a film to light coming through said lens means;

power source circuit means for providing power;

focus detecting means for detecting the focus of said lens means upon the object;

supplementary means for providing an approximate focus of the lens means upon the object and for producing a characteristic output indicative of an approximately focused condition of the lens means relative to the object when the lens means is positioned at an approximately focused position relative to the object;

voltage level detecting means for detecting whether the voltage level of power provided by said power source circuit means is over a predetermined level and for producing a characteristic output when detecting that the voltage level of the power is below said predetermined level;

prohibiting means responsive to the characteristic output of said voltage level detecting means to prohibit the operation of said exposure means; and enabling means responsive to the characteristic output of said supplementary means to enable the operation of said exposure means during a condition when said voltage level detecting means produces the characteristic output that the voltage level of the power is below the predetermined level.

44. A camera according to claim 43, wherein said focus detecting means is arranged to produce a characteristic output indicative of a properly focused condition of the lens means relative to the object when the lens means is positioned at a properly focused position relative to the object; and wherein said enabling means is further responsive to the characteristic output of said focus detecting means to enable the operation of said exposure means during a condition when said voltage level detecting means never produces said characteristic output.

45. A camera according to claims 43 or 44, further comprising:

means responsive to the characteristic output of said voltage level detecting means to render said focus detecting means inoperative while rendering said supplementary means operative.

* * * * *